(12) United States Patent
Duong

(10) Patent No.: US 7,979,834 B1
(45) Date of Patent: Jul. 12, 2011

(54) PREDICTING TIMING DEGRADATIONS FOR DATA SIGNALS IN AN INTEGRATED CIRCUIT

(75) Inventor: Anthony T. Duong, Saratoga, CA (US)

(73) Assignee: Xilinx, Inc., San Jose, CA (US)

(*) Notice: Subject to any disclaimer, the term of this patent is extended or adjusted under 35 U.S.C. 154(b) by 763 days.

(21) Appl. No.: 12/018,992

(22) Filed: Jan. 24, 2008

(51) Int. Cl.
*G06F 17/50* (2006.01)
(52) U.S. Cl. ......... 716/136; 716/108; 716/113; 716/117
(58) Field of Classification Search .................. None
See application file for complete search history.

(56) References Cited

U.S. PATENT DOCUMENTS

| | | | | |
|---|---|---|---|---|
| 5,418,789 A | * | 5/1995 | Gersbach et al. | 714/705 |
| 5,974,247 A | * | 10/1999 | Yonezawa | 703/19 |
| 6,795,802 B2 | * | 9/2004 | Yonezawa et al. | 703/19 |
| 7,058,921 B1 | * | 6/2006 | Hwang et al. | 716/116 |
| 7,139,691 B1 | | 11/2006 | Duong | |
| 7,225,420 B2 | * | 5/2007 | Cress | 716/6 |
| 7,299,439 B1 | * | 11/2007 | Slonim et al. | 716/116 |
| 7,328,420 B1 | * | 2/2008 | Datta et al. | 716/11 |
| 7,359,843 B1 | * | 4/2008 | Keller et al. | 703/2 |
| 7,428,717 B1 | * | 9/2008 | Duong | 716/6 |
| 7,559,046 B1 | * | 7/2009 | Datta et al. | 716/11 |
| 7,562,323 B1 | * | 7/2009 | Bai et al. | 716/5 |
| 7,788,620 B1 | * | 8/2010 | Xue et al. | 716/113 |
| 2004/0078175 A1 | * | 4/2004 | Shaw et al. | 703/14 |

OTHER PUBLICATIONS

Buckwalter et al., "Synchronization Design of a Coupled Phase-Locked Loop", IEEE Trans. on Microwave Theory and Techniques, vol. 51, No. 3, Mar. 2003, pp. 952-960.*
U.S. Appl. No. 12/018,055, filed Jan. 22, 2008, Duong.

* cited by examiner

*Primary Examiner* — Leigh Marie Garbowski
(74) *Attorney, Agent, or Firm* — Kevin T. Cuenot

(57) ABSTRACT

A computer-implemented method of predicting timing characteristics within a semiconductor device can include determining configuration information for the semiconductor device and determining a measure of timing degradation for data signals of the semiconductor device according to the configuration information. The measure of timing degradation for the data signals can be output.

20 Claims, 28 Drawing Sheets

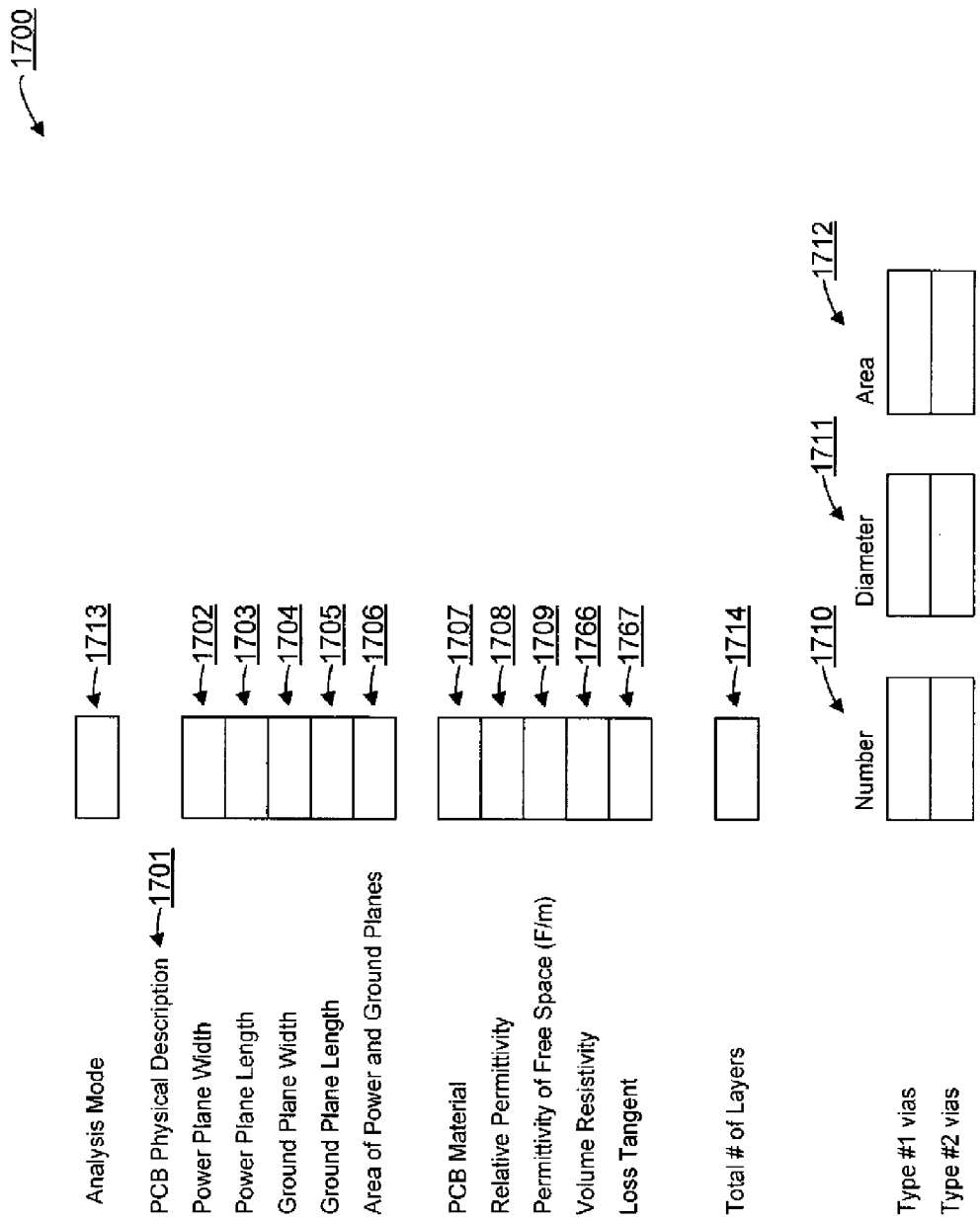

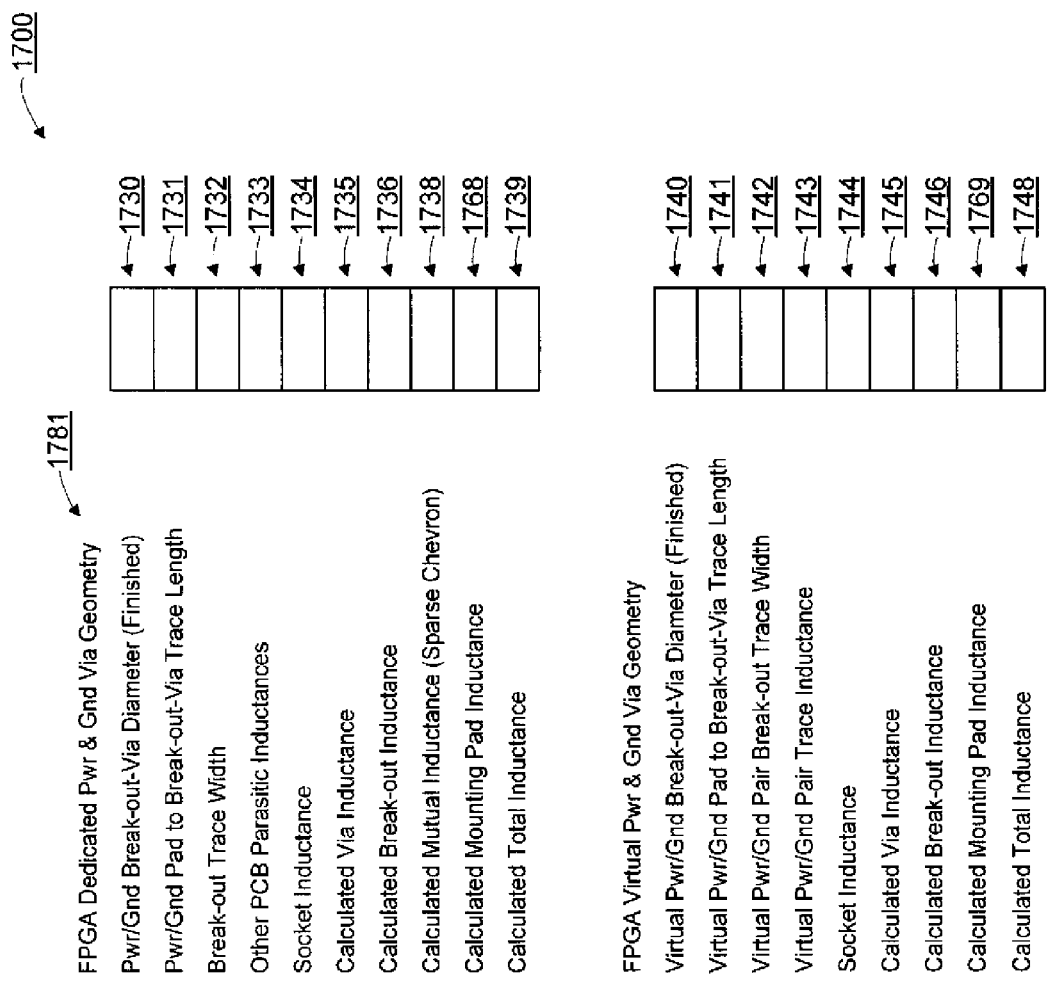

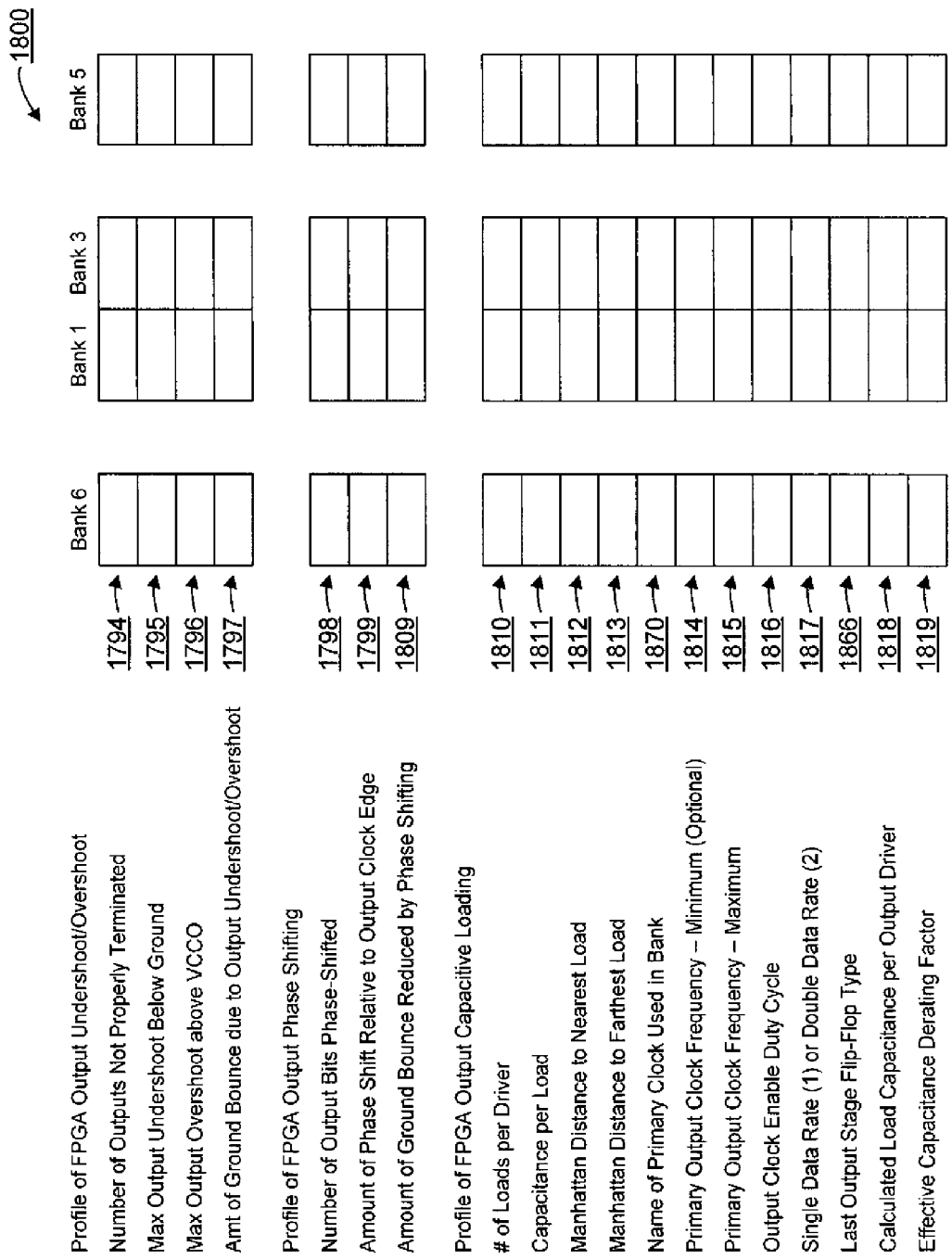

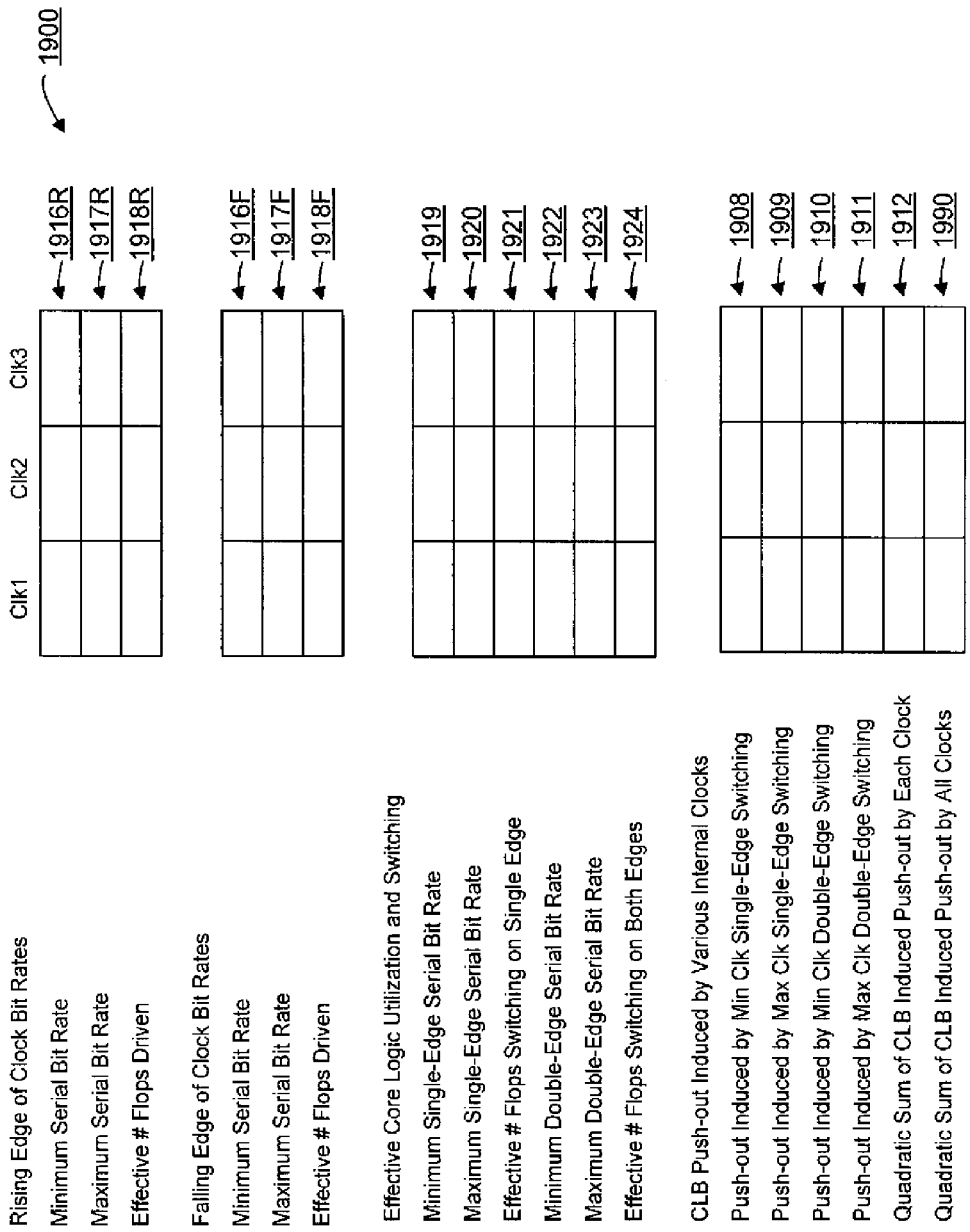

PREDICTING TIMING DEGRADATIONS FOR DATA SIGNALS IN AN INTEGRATED CIRCUIT

FIELD OF THE INVENTION

The embodiments disclosed herein relate to integrated circuit devices (ICs). More particularly, the embodiments relate to predicting timing characteristics within an IC.

BACKGROUND

Programmable logic devices (PLDs) are a well-known type of integrated circuit that can be programmed to perform specified logic functions. One type of PLD, the field programmable gate array (FPGA), typically includes an array of programmable tiles. These programmable tiles can include, for example, input/output blocks (IOBs), configurable logic blocks (CLBs), dedicated random access memory blocks (BRAMs), multipliers, digital signal processing blocks (DSPs), processors, clock managers, delay lock loops (DLLs), and so forth.

Another type of PLD is the Complex Programmable Logic Device (CPLD). A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include, but are not limited to, these exemplary devices and further can include devices that are only partially programmable.

ICs typically suffer from a number of different timing degradations. For example, jitter is one type of timing degradation that refers to a deviation of some aspect of a clock signal within an IC. While jitter can influence many aspects of a circuit design, other timing degradations exist that operate independently of jitter. These timing degradations can result in time delays in data signals as well as variance in the rise and/or fall times of data signals. These timing degradations should be accounted for to better characterize and understand the operation of circuit designs implemented within ICs.

SUMMARY OF THE INVENTION

The embodiments disclosed herein relate to semiconductor devices or integrated circuit devices and, more particularly, to predicting timing characteristics of such devices. One embodiment of the present invention includes a computer-implemented method of predicting timing characteristics within a semiconductor device. The method includes determining configuration information for the semiconductor device and determining a measure of timing degradation for data signals of the semiconductor device according to the configuration information. The measure of timing degradation for the data signals can be output.

In one embodiment, the measure of timing degradation is push-out. In that case, determining a measure of timing degradation includes scaling the measure of push-out according to resource utilization within the semiconductor device. Determining a measure of timing degradation also includes determining usage of configuration logic blocks (CLBs) within the semiconductor device and scaling the measure of push-out according to CLB usage. Determining a measure of timing degradation also includes determining usage of input/output (I/O) banks within the semiconductor device and scaling the measure of push-out according to I/O bank usage.

In another embodiment, the measure of timing degradation is pull-in. Accordingly, determining a measure of timing degradation includes scaling the measure of pull-in according to resource utilization within the semiconductor device. Determining a measure of timing degradation includes determining usage of CLBs within the semiconductor device and scaling the measure of pull-in according to CLB usage. Determining a measure of timing degradation also includes determining usage of I/O banks within the semiconductor device and scaling the measure of pull-in according to I/O bank usage.

In another embodiment, the measure of timing degradation is change in rise time. In that case, determining a measure of timing degradation includes calculating a rise time for data signals according to resource usage of the semiconductor device specified by the configuration information. Determining a measure of timing degradation includes determining usage of CLBs within the semiconductor device and scaling the change in rise time according to CLB usage. Usage of I/O banks within the semiconductor device is also determined. The change in rise time can be scaled according to I/O bank usage.

In another embodiment, the measure of timing degradation is change in fall time. Accordingly, determining a measure of timing degradation includes calculating a fall time for data signals according to resource usage of the semiconductor device specified by the configuration information. For example, determining a measure of timing degradation includes determining usage of CLBs within the semiconductor device and scaling the change in fall time according to CLB usage. Usage of I/O banks within the semiconductor device can be determined. The change in fall time further can be scaled according to I/O bank usage.

Another embodiment of the present invention includes a computer-implemented method of predicting timing degradation within a semiconductor device. The method includes selecting a type of timing degradation affecting data signals of the semiconductor device, selecting a type of circuit element of the semiconductor device, and selecting a utilization level of the selected type of circuit element. A level of timing degradation for data signals is determined according to utilization of the selected type of circuit element. The level of timing degradation can be output.

The computer-implemented method further can include setting at least one threshold, comparing the measure of timing degradation to the threshold, and indicating a status of the timing degradation with respect to the threshold according to the comparison. Selecting a type of timing degradation can include selecting the type of timing degradation to be push-out, pull-in, change in rise time, and/or change in fall time.

Yet another embodiment of the present invention includes a computer program product including a computer-usable medium having computer-usable program code that, when executed by an information processing system, causes the information processing system to perform the various steps and/or functions disclosed herein.

BRIEF DESCRIPTION OF THE DRAWINGS

FIGS. 13A-1 through 13C-4 are diagrams illustrating a visual interface for a circuit design tool in accordance with another embodiment of the present invention.

DETAILED DESCRIPTION

Figure 1:
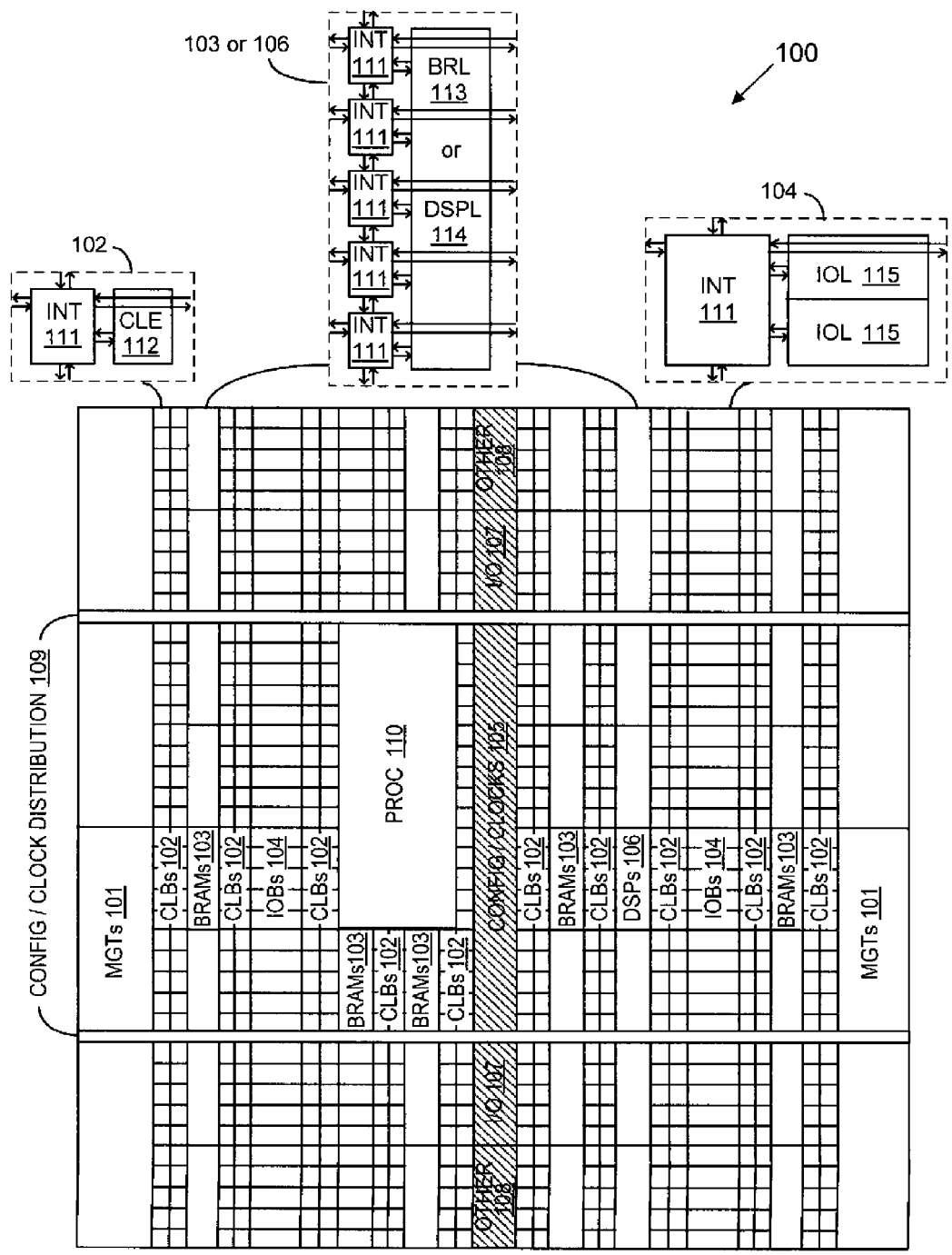
FIG. 1 is a simplified block diagram depicting an exemplary embodiment of a columnar Field Programmable Gate Array (FPGA) architecture in which one or more aspects of the invention may be implemented.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

There are many types of complex integrated circuits (ICs) for which external factors affect performance. General categories of these complex ICs may include system-on-chips (SoCs), processors, application specific ICs (ASICs), and application specific standard products (ASSPs), among others. The terms "include" and "including," as used herein, mean including without limitation. Examples of such ICs can include microprocessors, digital signal processors (DSPs), communication ICs including framers and cross-connects, programmable logic devices (PLDs), memories, and graphic signal processors (GSPs).

One type of complex PLD is a Field Programmable Gate Array (FPGA). An FPGA is used throughout this specification by way of example to better illustrate the various embodiments of the present invention. It should be appreciated, however, that the embodiments disclosed herein can be applied to other types of ICs. From the exemplary FPGA architecture discussed, it will be apparent that the embodiments described herein can be applied to any IC that is subject to one or more performance affecting factors.

The embodiments disclosed herein relate to predicting degradations in circuit timing. More particularly, the embodiments disclosed herein relate to predicting and planning for degradations in timing that affect data signals, e.g., non-clock signals, of the circuit. Push-out and pull-in are two timing degradations that operate on data signals. These quantities are independent of other noise induced effects such as jitter. As such, it becomes necessary to accurately estimate push-out and pull-in so that more precise simulations of circuit behavior can be implemented.

Push-out refers to a delay that is induced in a data signal. The effects of push-out generally are attributable to input/output blocks (IOBs) and configurable logic blocks, as will be explained in further detail. Pull-in refers to a degradation in the threshold level for an input signal. As the threshold degrades lower, the time at which an input signal is detected becomes earlier. Pull-in results in an effective shifting of input signals earlier in time.

FIG. 1 illustrates an FPGA architecture 100 that includes a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized input/output (I/O) ports 107 (e.g., configuration ports and clock ports), and other programmable logic 108 such as digital clock managers, analog-to-digital converters, system monitoring logic, and so forth. Some FPGAs also include dedicated processor blocks (PROC) 110.

In some FPGAs, each programmable tile includes a programmable interconnect element (INT) 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element (CLE) 112 that can be programmed to implement user logic plus a single programmable interconnect element 111. A BRAM 103 can include a BRAM logic element (BRL) 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL) 114 in addition to an appropriate number of programmable interconnect elements 111. An IOB 104 can include, for example, two instances of an input/output logic element (IOL) 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown crosshatched in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks or dedicated logic. For example, the processor block 110 shown in FIG. 1 spans several columns of CLBs and BRAMs.

FIG. 1 is intended to illustrate an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be, for example, a Virtex-4™ FPGA from Xilinx, Inc. of San Jose, Calif. (Xilinx and Virtex are trademarks of Xilinx, Inc. in the United States, other countries, or both.)

Figure 2:
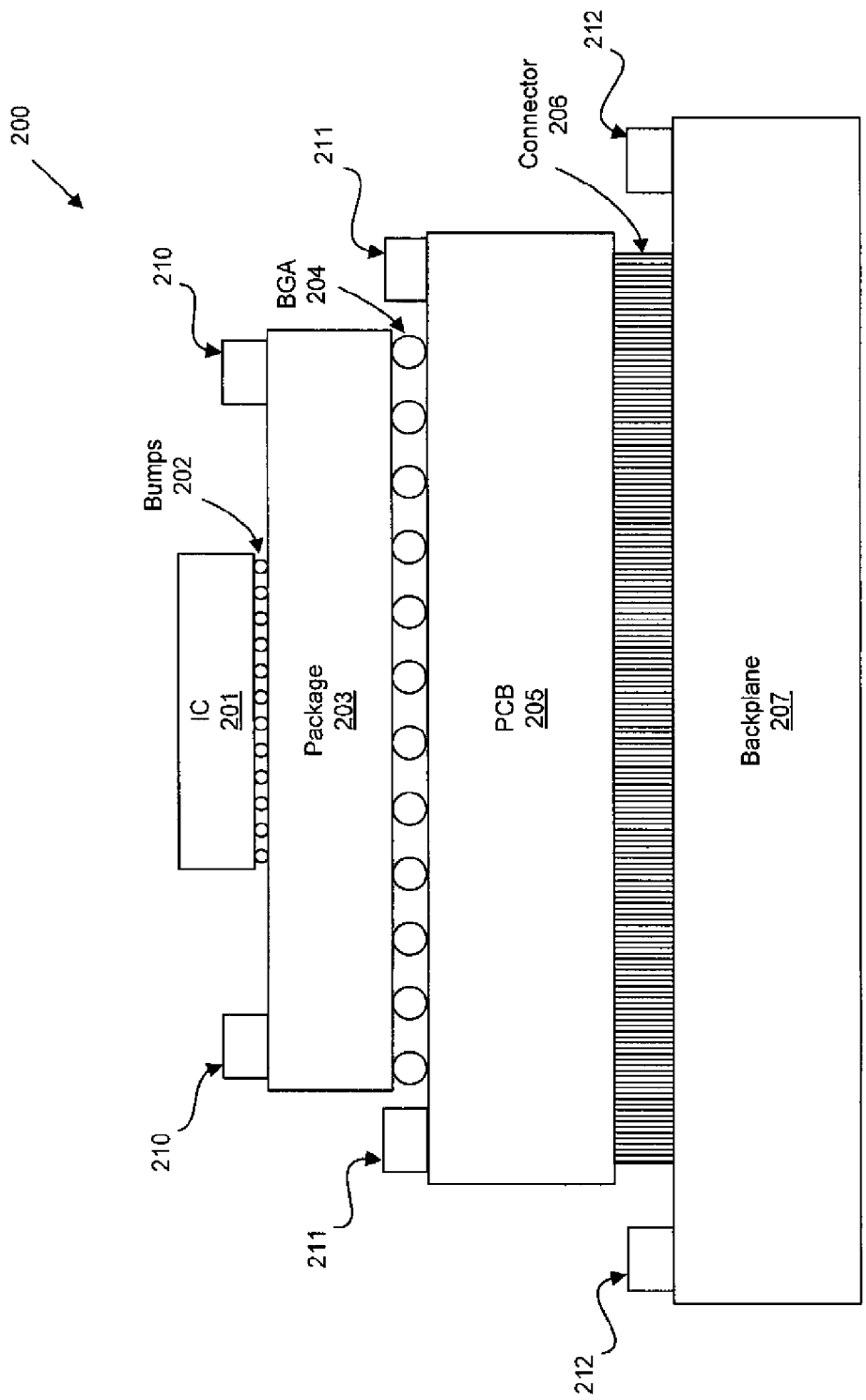
FIG. 2 is a side view depicting an exemplary embodiment of an assembly including an integrated circuit coupled to a printed circuit board (PCB).

FIG. 2 is a side view depicting an exemplary embodiment of an assembly 200 including an IC 201 coupled to a printed circuit board (PCB) 205. IC 201 may be an FPGA as illustrated in FIG. 1 or another known type of IC. Although FIG. 2 specifically identifies different types of interconnect arrays, such as solder bumps 202, ball grid array (BGA) 204 and connector 206, it should be understood that any one of these types of interconnect arrays, or any combination of two or more of these interconnect arrays, may be used.

As shown in this embodiment, IC 201 is coupled to package 203 via solder bumps 202. Solder bumps 202 may be configured, or otherwise laid out, using repeated application of an interconnect pattern, as is known. Package 203, which may be made of an organic or inorganic material as is known, can be coupled to PCB 205 via BGA 204. BGA 204 may be a fine-pitch BGA. BGA 204 may be laid out in accordance with tiling with a tile, as is known.

PCB 205 may be a line card or daughter card coupled to a backplane, motherboard, or other larger PCB via connector topology 206. Thus, although a backplane 207 is used for this example, it should be understood that other types of PCBs may be used. Connector topology 206 may be configured using one or more tiles as will be described herein in further detail. Moreover, it should be appreciated that a multi-chip module can be coupled to a PCB using one or more tiles for connector topology. Furthermore, a PCB-to-mezzanine card application may be coupled using a connector topology having one or more tiles.

Although the description of the assembly 200 of FIG. 2 has been in terms of solder bumps 202, BGA 204, and connector topology 206, it should be understood that a tile, as described herein, may be used with other types of connectors for communicating information. Examples of other types of connectors can include, but are not limited to, optical connectors. Moreover, it should be appreciated that although a tile, as described herein, is used with flip-chip technology, a wirebond or other known interconnect technology may be used. Furthermore, although an example of a BGA is used, it should be understood that other connector technologies, including land grid array (LGA) and column grid array (CGA), among other known connector technologies, may be used.

To address noise owing to components external to IC 201, such as package 203, PCB 205, and backplane 207, it is known to couple decoupling capacitors to these various IC external items. For example, one or more on-package capacitors 210 may be used for to reduce noise. Moreover, one or more on-PCB capacitors 211 may be used to reduce noise. Furthermore, one or more on-backplane capacitors 212 may be used to reduce noise. The amount of capacitance used in each of these instances is application-dependent, and may be determined as described below in additional detail.

In contrast to ASICs, FPGAs need not be manufactured with a predetermined user design in view. As such, the performance of an FPGA may be affected by the types and amounts of circuitry in a user's design and the operating parameters of the user's design, among other factors. For example, response of capacitors used in a user's design may affect the power distribution system (PDS) response. This is but one example; it should be understood that there are many factors which influence performance.

Figure 4:
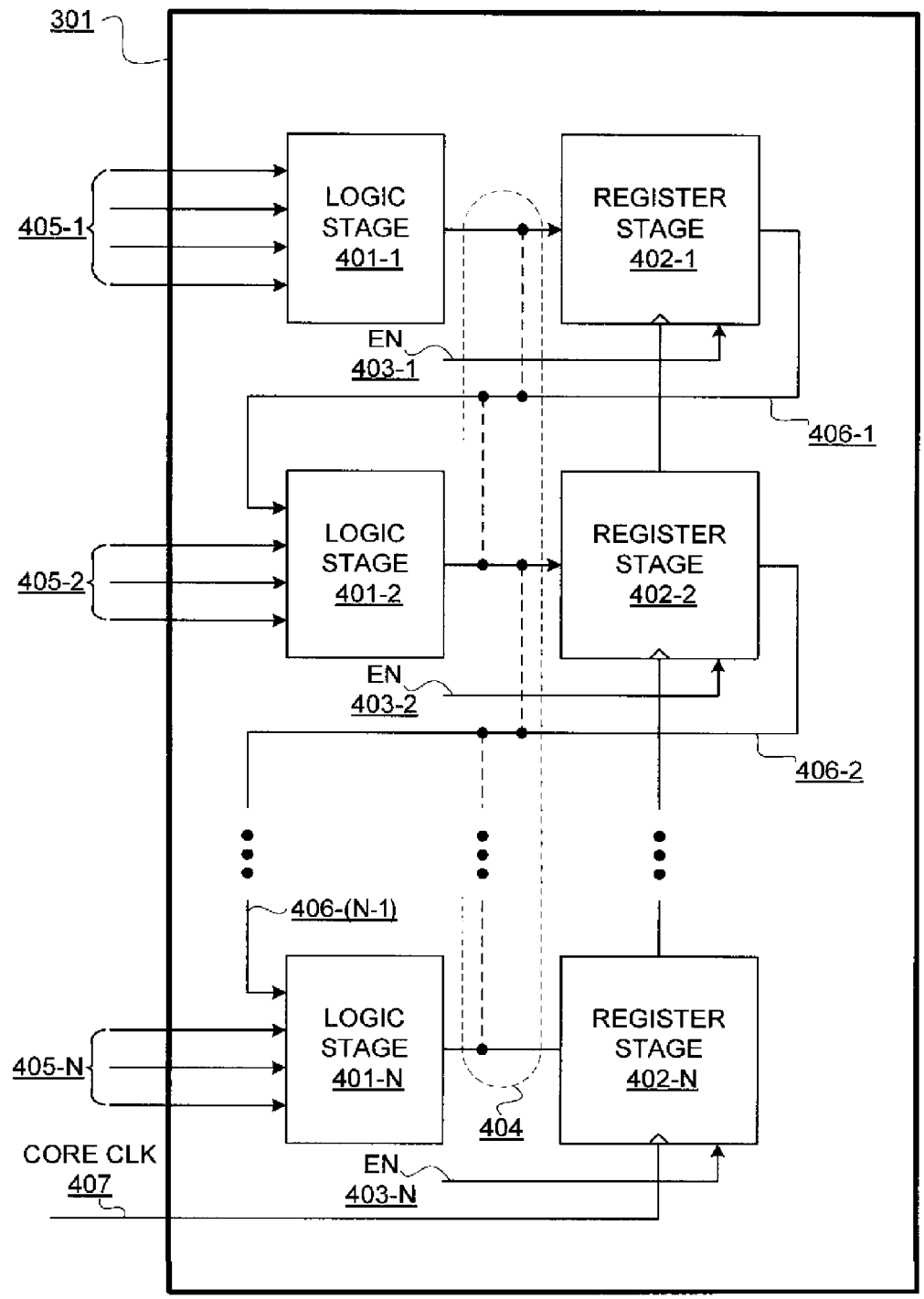
FIG. 4 is block diagram depicting an exemplary embodiment of a core logic block.
Figure 5:
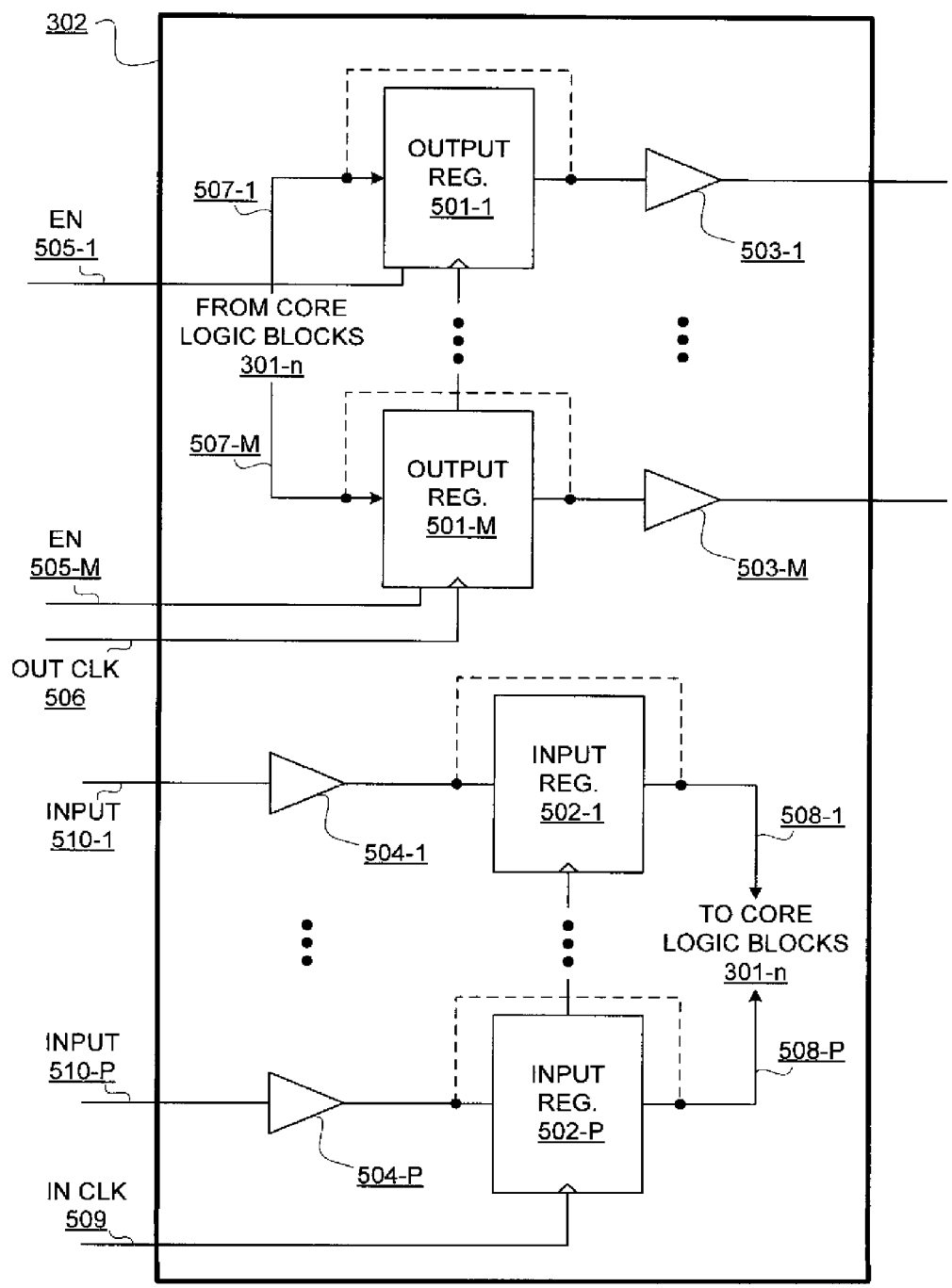
FIG. 5 is a block diagram depicting an exemplary embodiment of an input/output (I/O) block.

To account for these factors in a meaningful way, a software application should be variable to account for a significant number of these factors, as well as to allow variation thereof, to not only predict performance based on variables but also to allow such performance to be enhanced by variation of one or more factors. Though variability is particularly relevant for implementations using programmable logic, including I/O variability, variability of such factors may be at issue in non-programmable logic applications as well. To better appreciate how signaling to and from an FPGA may be related to noise management, FIGS. 3 through 5 provide examples of FPGA signaling.

Figure 3:
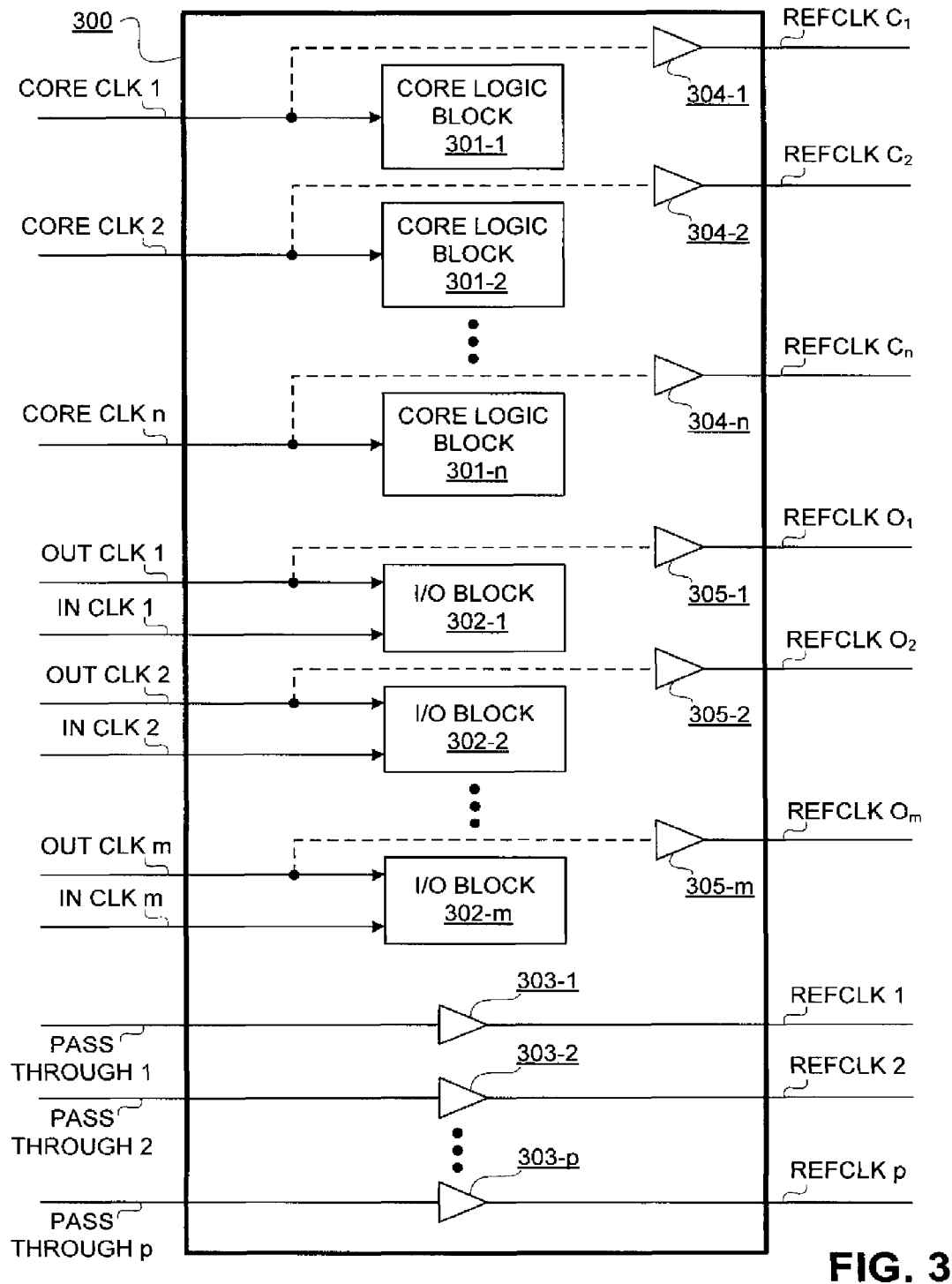
FIG. 3 is a block diagram depicting an exemplary embodiment for providing reference clock signals.

FIG. 3 is a block diagram depicting an exemplary embodiment for providing reference clock signals. As used herein, the terms "clock signal" and "clock" may be used interchangeably. Regarding FIG. 3, a portion 300 of an FPGA can include core logic blocks 301-1 through 301-$n$, I/O blocks 302-1 through 302-$m$, and pass-through output buffers 303-1 through 303-$p$, where m, n, and p may all be positive integers greater than one. Core logic blocks 301-1 through 301-$n$ may be thought of as circuit implementations instantiated in CLBs or any functionality implemented in internal-only logic blocks of an FPGA, including but not limited to BRAM, DSP, and DCM, among other known FPGA internal logic blocks, that do not directly interface to circuitry external to the FPGA without going through at least one I/O block. I/O blocks 302-1 through 302-$m$ may be thought of as circuitry that is functionality instantiated in IOBs.

Core clocks 1 through n can be respectively provided to core logic blocks 301-1 through 301-$n$. Optionally, core clocks 1 through n may be respectively provided to output buffers 304-1 through 304-$n$ to provide reference clocks $C_1$ through $C_n$ externally from an FPGA. Furthermore, each I/O block 302-1 through 302-$m$ may respectively receive an output clock signal 1 through output clock signal m. Responsive to output clock signals 1 through m, each I/O block 302-1 through 302-$m$ may respectively provide an input clock signal 1 through m. Optionally, output clock signals 1 through m may respectively be provided to output buffers 305-1 through 305-$m$ for providing reference clock output signals $O_1$ through $O_m$ externally from an FPGA.

Additionally, pass-through signals 1 through p may be respectively provided to pass-through output buffers 303-1 through 303-$p$ for respectively providing reference clock signals 1 through p externally from an FPGA. Thus, it should be appreciated that reference clock signaling, such as reference clocks $C_1$ through $C_n$, $O_1$ through $O_m$, and 1 through p, may be associated with different types of circuitry internal to an FPGA, where signals illustratively shown on the left of portion 300 of FIG. 3 are generally FPGA internal signals and signals illustratively shown on the right of portion 300 of FIG. 3 are generally FPGA external signals.

FIG. 4 is block diagram depicting an exemplary embodiment of a core logic block 301, such as a core logic block of core logic blocks 301-1 through 301-n of FIG. 3. One or more inputs 405-1 through 405-N may be respectively provided to logic stages 401-1 through 401-N, where N is an integer greater than one. Output of each logic stage 401-1 through 401-N may be respectively provided as input to register stages 402-1 through 402-N. Output 406-1 of register stage 402-1 may be provided as an input to logic stage 401-2. Output 406-2 of register stage 402-2 may be provided as an input to a next logic stage after logic stage 401-2, and so on, such that an output 406-(N−1) is provided to logic stage 401-N.

Each register stage 402-1 through 402-N may be respectively provided with an enable signal 403-1 through 403-N. Notably, enable signals 403-1 through 403-N may be the same or different signals. Furthermore, one enable signal may be a delayed version of another enable signal for one or more of enable signals 403-1 through 403-N. It should be appreciated that each logic stage 401 or associated register stage 402 can be optional, as such logic or register stages may be bypassed as generally indicated by optional bypass connections 404 between outputs of logic stages 401 and associated register stages 402. Each register stage 402-1 through 402-N may be clocked responsive to a core clock signal 407. Notably, core clock signal 407 may be a core clock signal as described with reference to FIG. 3. Although rising-edge-triggered register stages are indicated, it should be appreciated that either falling-edge or rising-edge triggering may be done for register stages 402.

FIG. 5 is a block diagram depicting an exemplary embodiment of an I/O block 302. I/O block 302 may be an I/O block of I/O blocks 302-1 through 302-m of FIG. 3. Data signaling, which may be obtained from core logic blocks 301 of FIG. 3, may be provided to output registers 501-1 through 501-M of I/O block 302, which signaling is generally indicated as input signals 507-1 through 507-M, where M is an integer greater than one. One or more of output registers 501-1 through 501-M may optionally be bypassed to respectively provide bypassed output to one or more output buffers 503-1 through 503-M. Output of output registers 501-1 through 501-M is respectively coupled to provide input to output buffers 503-1 through 503-M. Enable signals, such as clock enable signals 505-1 through 505-M, may be respectively provided to output registers 501-1 through 501-M. Enable signals 505-1 through 505-M may be the same or different signals. An output clock signal 506 can be provided to output registers 501-1 through 501-M. Output clock signal 506 may be an output clock signal of output clock signals 1 through m as described with reference to FIG. 3.

On an input side of I/O block 302, input signaling 510-1 through 510-P may be respectively provided to input buffers 504-1 through 504-P, for P an integer greater than one. Output of input buffers 504-1 through 504-P may be respectively provided to input registers 502-1 through 502-P. Notably, one or more of input registers 502-1 through 502-P may optionally be bypassed such that output of one or more of input buffers 504-1 through 504-P is provided to core logic blocks 301-1 through 301-n as generally indicated by output signals 508-1 through 508-P provided thereto. Output of input registers 502-1 through 502-P may be provided as respective output signals 508-1 through 508-P to core logic blocks 301-1 through 301-n. Again, clock enable signals, though not illustratively shown, may be provided to input registers 502-1 through 502-P as generally input registers may be held in a clock enabled state, and input registers 502-1 through 502-P may be clocked responsive to input clock signal 509. Input clock signal 509 may be an input clock signal of input clock signals 1 through m as described with reference to FIG. 3.

With reference to FIGS. 3 through 5, it should be appreciated that push-out and/or pull-in may be caused by Simultaneous Switching of Outputs (SSO) or Simultaneous Switching of Inputs (SSI), or any combination thereof. Additionally, core logic blocks, which may be provided by CLBs in an FPGA implementation, may cause push-out and/or pull-in responsive to switching by one or more register stages in response to one or more core clock signals. Moreover, I/O blocks may cause push-out and/or pull-in owing to switching by one or more output registers or one or more input registers, or any combination thereof, respectively responsive to one or more output clock signals or one or more input clock signals. Furthermore, pass-through signals in proximity to either or both one or more core logic blocks or one or more I/O blocks may have push-out and/or pull-in coupled to such signals passing through output buffers, and thus themselves may have push-out and/or pull-in when used to drive devices external to an IC, which in this particular example is an FPGA. Again with reference to FIG. 3, it should be appreciated that reference clock signals on the right of portion 300 are provided off-chip with respect to an IC die, and clock signals and pass-through signals, which may be clock signals in this example, on the left of portion 300 of FIG. 3 are internal IC die signals.

With respect to a design instantiated in programmable logic or an ASIC, or any combination thereof, it may be that power distribution system (PDS) response is a reasonably accurate predictor of push-out and/or pull-in. In other words, PDS response may be used to predict push-out and/or pull-in in data signals when viewing such PDS response with respect to system elements. Thus, for example, PDS response of a PCB, a die and package in combination, and decoupling capacitors associated therewith, as illustratively shown in FIG. 2, may be used for predicting push-out and/or pull-in. Furthermore, if a backplane is added to this configuration, PDS response of such backplane and any associated decoupling capacitance may be included in predicting push-out and/or pull-in.

The amount of logic, as well as the frequency of switching of such logic, may be factors in predicting push-out and/or pull-in. PDS response may change for changes in reference clock frequency versus core clock frequency or for changes in I/O clock frequency versus reference clock frequency. Accordingly, by changing clock frequencies of one or more of these clocks, different levels of push-out and/or pull-in may result. Thus, modeling may be used where frequency of one or more of these clock frequencies is changed in order to provide noise management with respect to push-out and/or pull-in. Other factors which may affect push-out and/or pull-in include temperature and supply of voltage, which may be thought of as scaling factors. Furthermore, the amount of ground bounce, as well as semiconductor process variation, may affect push-out and/or pull-in.

Figure 6:
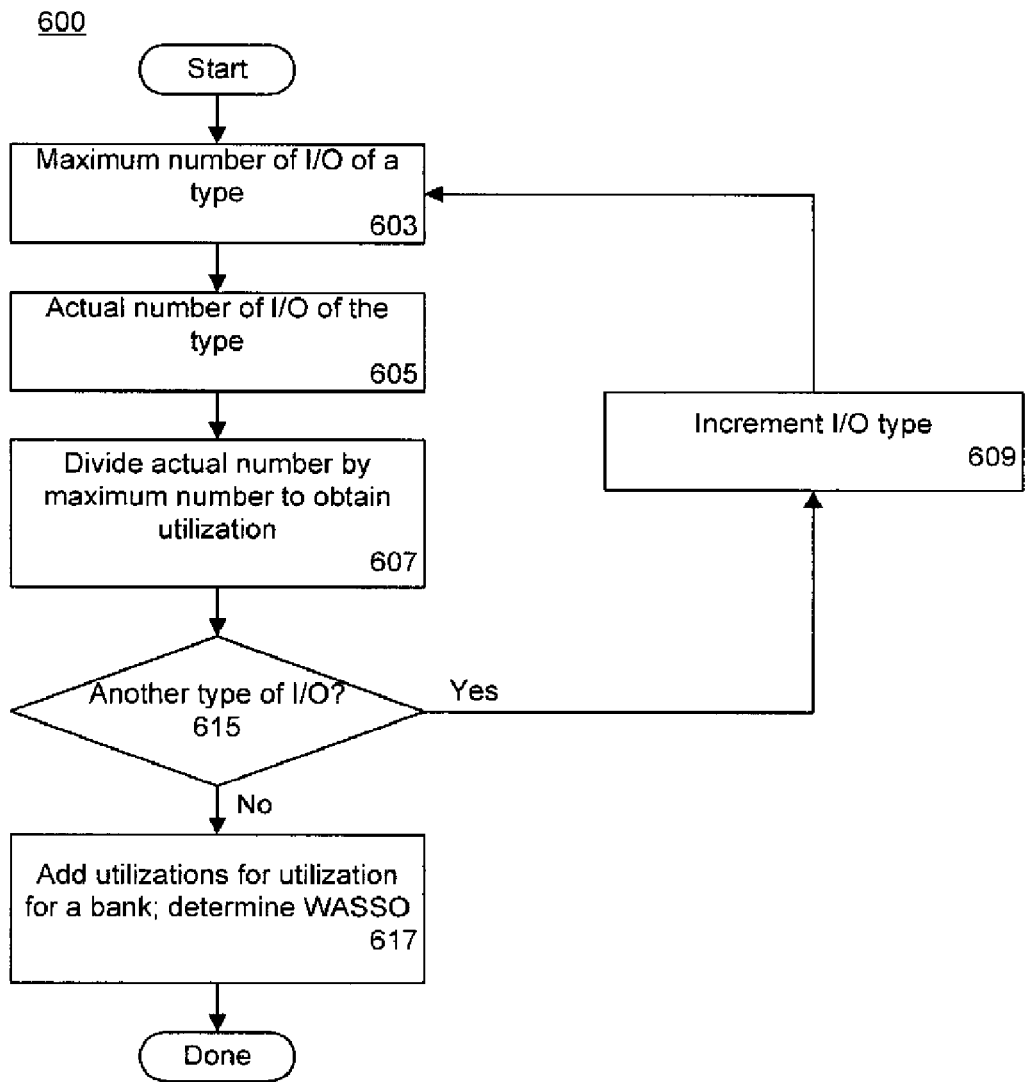
FIG. 6 is a flow chart depicting an exemplary method of determining a Weighted Average Simultaneous Switching of Outputs (WASSO).

FIG. 6 is a flow chart depicting an exemplary method 600 of determining a Weighted Average Simultaneous Switching of Outputs (WASSO). The method 600 can be implemented by, for example, a software-based circuit design tool, e.g., an electronic design automation (EDA) tool, a computer aided design (CAD) tool, or the like. In another example, the method can be implemented by a WASSO analysis module disposed within such a design tool.

In any case, the method 600 is for one bank of a plurality of banks of an IC, and thus may be repeated for each bank of an IC to obtain an I/O utilization for each bank of pins of an IC. However, within a grouping or block of I/Os of a bank, there may be different types of interfaces, such as HSTL and SSTL, among others, implemented. In step 601, a maximum number for a type of I/O can be initialized. An actual number of the I/O type used can be determined in step 605 for a proposed implementation. In step 607, the actual number determined in step 605 can be divided by the maximum number from step 603 to provide a utilization for that I/O type. It should be appreciated that utilization of an I/O type may be used to provide a WASSO for a bank.

If in step 615 it is determined that another type of I/O of the bank is to be processed, in step 609 the I/O type can be incremented. Steps 603 through 607 can be repeated for another I/O type. The method can repeat in this manner until all types of I/Os have been processed as determined in step 615. If no more I/Os for a bank are to be processed as determined in step 615, the utilizations for each I/O type as determined in step 607 can be added in step 617. The total utilization determined in step 617 may be used as a WASSO value for a bank.

Determining a WASSO for I/Os of a bank to be used allows a circuit designer to evaluate ground bounce performance of a bank by homogenizing the various loads driven by the I/Os of bank. For purposes of clarity, WASSO has been described with reference to FIG. 6. However, a weighted average SSI (WASSI) may equally apply with respect to use of I/Os of a bank used for input of information to an IC die. Thus, WASSO calculation flow 600 may include WASSI with respect to determining utilization of I/O devices of a bank, and whether I/O simultaneous switching exceeds a threshold amount of simultaneous switching.

Figure 7:
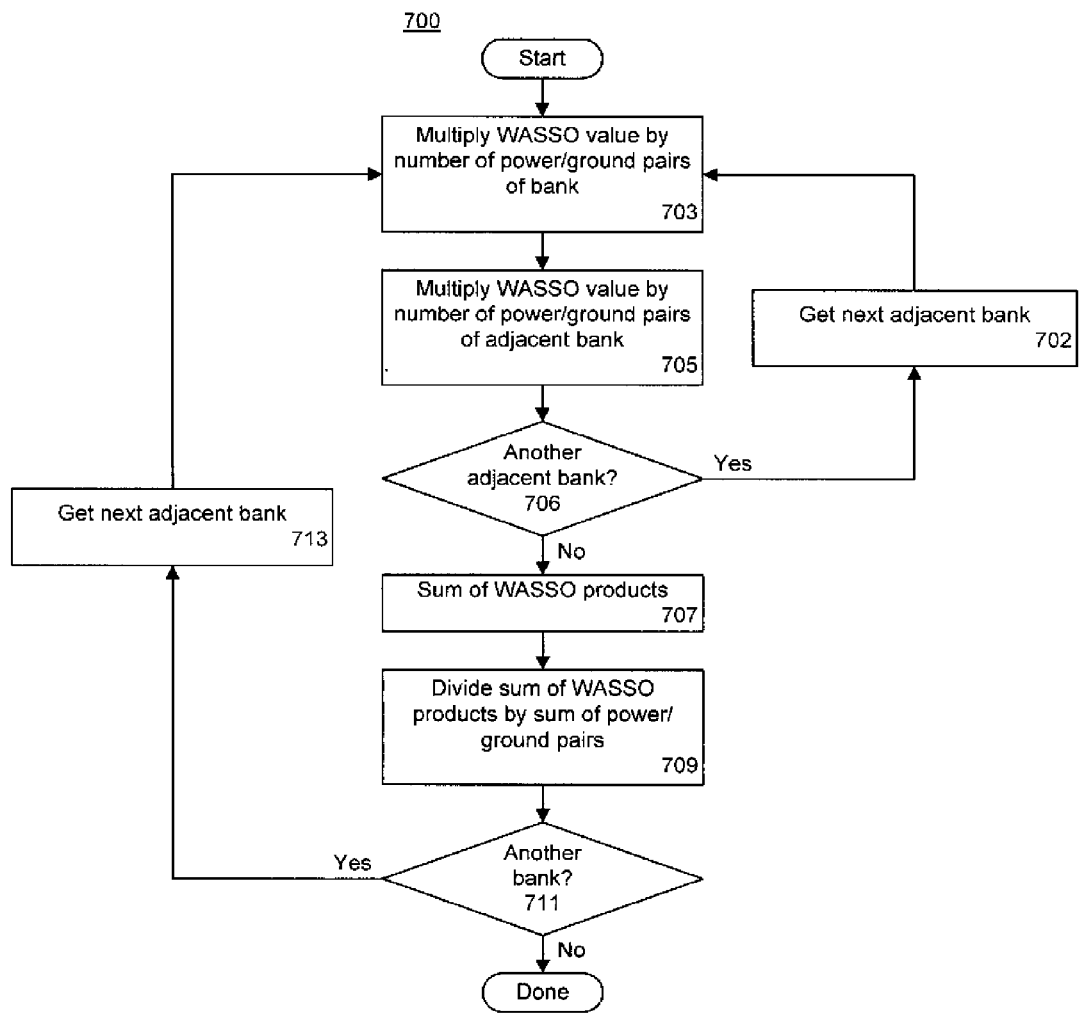
FIG. 7 is a flow chart depicting an exemplary method of determining a 2-Bank WASSO utilization flow.

FIG. 7 is a flow chart depicting an exemplary method 700 of determining a 2-Bank WASSO utilization. Method 700 can be implemented within a design tool, as discussed, e.g., by a WASSO analysis module. The method 700 can be used in evaluating ground bounce voltage for adjacent banks. By adjacent banks, it is meant horizontally or vertically adjacent along an edge of the banks of an IC die. The method 700 can begin in a state where an initial bank may be set; the initial bank having I/O, or at least output drivers, as associated with SSO.

In step 703, a previously determined WASSO value for the bank, as described above, can be obtained and multiplied by the number of power/ground pairs of the bank. In step 705, the WASSO value used in step 703 may be multiplied by the number of power/ground pairs of an adjacent bank to the initial bank, where the adjacent bank has I/O devices as associated with SSO. In step 706, it may be determined whether there is another adjacent bank to the initial bank obtained in step 703. If there is another adjacent bank having I/O devices associated with SSO as determined in step 706, the next adjacent bank can be obtained in step 702. Accordingly, the WASSO value used in step 703 can be multiplied by the number of power/ground pairs in the next adjacent bank in step 705. This loop may repeat until each adjacent bank to the initial bank is processed. Once no other adjacent bank is to be processed, as determined in step 706, in step 707 WASSO products of the bank and of adjacent banks thereto as determined in steps 703 and 705, respectively, can be summed. In step 709, the sum obtained in step 707 can be divided by the sum of all power/ground pairs in each of the adjacent banks obtained. The result of step 709 is a 2-Bank WASSO value.

In step 711, it may be determined whether another 2-Bank WASSO value is to be determined for another bank. If another bank is to be processed as determined in step 711, in step 713, the bank may be incremented and the method may proceed again starting at step 703, but for the other bank. Accordingly, method 700 may be repeated for each bank, and once it is determined that there are no other banks to process as determined in step 711, method may end.

Figure 8:
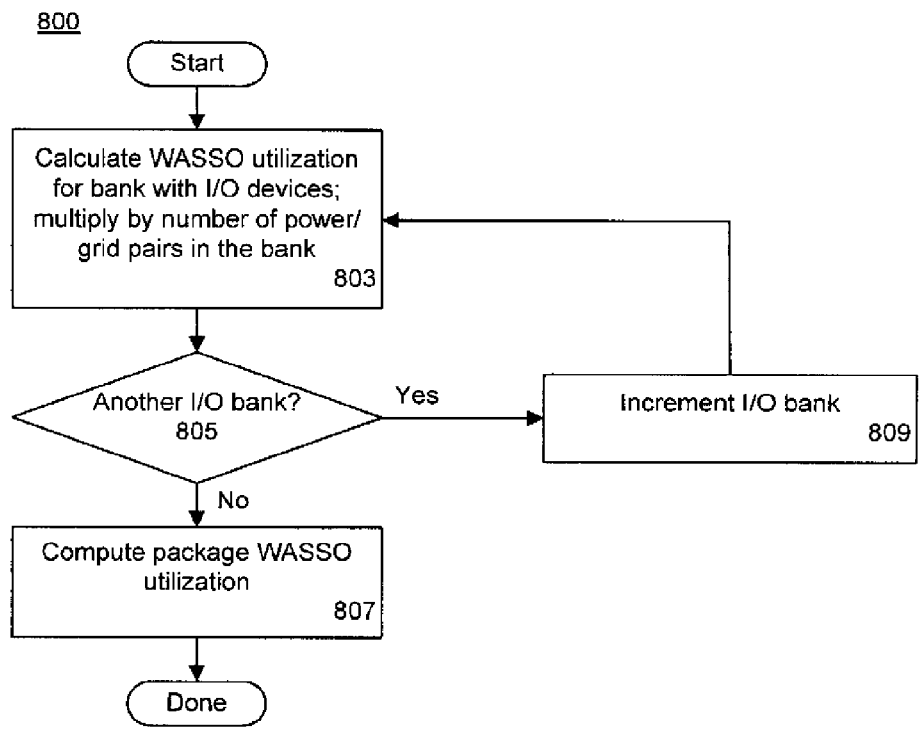
FIG. 8 is a flow chart depicting an exemplary method of determining a package WASSO utilization.

FIG. 8 is a flow diagram depicting an exemplary method 800 of determining a package WASSO utilization. Method 800 can be implemented by a design tool as described. Method 800 can begin in a state where an initial bank having I/O devices associated with SSO is obtained.

Accordingly, in step 803, WASSO utilization for the initial bank may be calculated. This WASSO utilization may be calculated as described with reference to FIG. 7. The WASSO utilization may be multiplied by the number of power/ground pairs in the initial bank as part of step 803. In step 805, it may be determined whether there is another bank to process. If there is another bank to process, in step 809 the bank can be incremented and a next or incremented bank can be processed in step 803.

Once all banks have had a WASSO utilization calculated therefor, a package WASSO utilization may be computed in step 807. Package WASSO utilization may be determined by taking the sum of each WASSO utilization multiplied by the power/ground pairs of a bank, namely the sum of all results of 803, and dividing that sum by the total number of power/ground pairs for each of the banks processed using package WASSO utilization flow 800. This determination of package WASSO utilization is illustratively shown in Equation 1:

$$\frac{\sum [(WASSO\ UTIL.)(NO.\ PWR/GRD\ PAIRS)]}{\sum (NO.PWR/GRD\ PAIRS)} \quad (1)$$

Additional details regarding WASSO may be found in U.S. Pat. No. 7,139,691 entitled "Method for Calculating Weighted Average Ground Bounce Noise Generated By Simultaneous Switching Outputs in a Digital System," which is incorporated herein by reference in its entirety.

Figure 9:
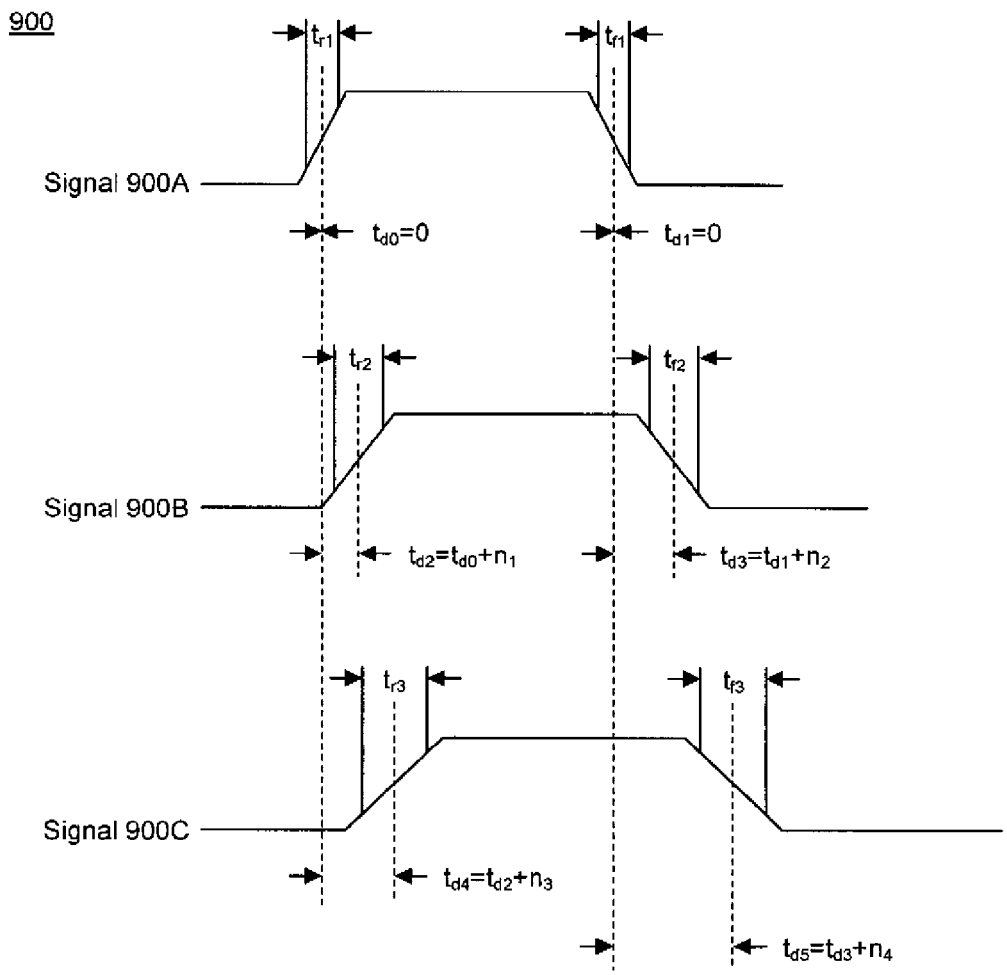
FIG. 9 is a signal diagram illustrating the effects of supply bounce and ground bounce on a data signal in accordance with another embodiment of the present invention.

FIG. 9 is a signal diagram illustrating the effects of supply bounce and ground bounce on a data signal 900 in accordance with another embodiment of the present invention. More particularly, FIG. 9 illustrates push-out with respect to a data signal 900 as more output drivers of an IC begin toggling. For example, the fewest number of drivers are toggling for signal 900A, more begin toggling for signal 900B, and the most begin toggling for signal 900C. Accordingly, signal 900A exhibits the smallest amount of push-out. Signal 900B exhibits more push-out than signal 900A. Signal 900C exhibits the largest amount of push-out.

As more drivers of an IC begin to toggle, more transient noise is induced on the internal supply rails that serve as voltage sources for the output drivers. The transient noise is commonly referred to as "supply bounce" and "ground bounce." As the amount of supply bounce and ground bound increase, the transition edges of signal 900 are pushed farther to the right, e.g., are delayed. Another aspect of push-out relates to the change in rise time and fall time for a data signal. As shown, both rise time and fall time increase proportionately with the number of output drivers that begin operation.

Factors such as, for example, the number of drivers, the I/O standard, the driver strength, slew rate, temperature, silicon speed, and the like may influence the amount of supply bounce and ground bounce in an IC. In general, as each of the following quantities increase, the delay, rise time, and fall time increase as well. These quantities include: number of drivers, driver strength, slew rate, capacitive load, and temperature. By comparison, lower supply voltages produce higher delay, rise time, and fall time. Slower speedgrades also result in higher delay, rise time, and fall time.

With this in mind, a review of FIG. 9 reveals that the delay $t_d$ increases from signal 900A, to signal 900B, to signal 900C. For example, $t_{d2}>t_{d0}$, $t_{d4}>t_{d2}$, $t_{d3}>t_{d1}$, $t_{d5}>t_{d3}$. Similarly, with respect to rise and fall time, FIG. 9 reveals that $t_{r2}>t_{r1}$, $t_{r3}>t_{r2}$, $t_{f2}>t_{f1}$, and $t_{f3}>t_{f2}$.

As more drivers become active, the drivers cause the internal rails to collapse. "Collapse," in this case, refers to the decrease in the potential difference, e.g., voltage, between the power and the ground rails. That is, the potential difference between power and ground decreases as the number of active drivers in the IC increases. This decreasing potential, e.g, "rail collapse," causes output driver performance to decrease, which causes an increase in delay, rise time, and fall time, e.g., push-out.

Figure 10:
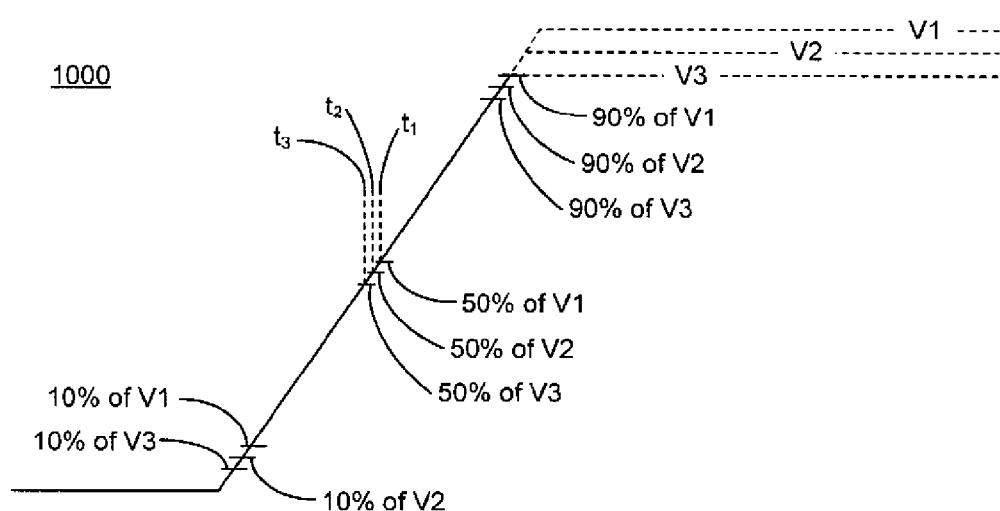
FIG. 10 is a signal diagram illustrating the effects of pull-in on a data signal in accordance with another embodiment of the present invention.

FIG. 10 is a signal diagram illustrating the effects of pull-in on a data signal 1000 in accordance with another embodiment of the present invention. In general, as the rails of an IC collapse, the 50% threshold for detecting signals at inputs to the IC also begins to decrease. Signal 1000 illustrates the case where different levels of transient noise on the power and ground rails have lead to varying voltage differentials between power and ground rails indicated as V1, V2, and V3. FIG. 10 indicates the 10% and 90% points for voltages V1, V2, and V3 as well as the 50% point.

As the 50% point decreases in terms of voltage due to collapsed rails, it can be seen that the time at which the 50% point is crossed shifts left, e.g., occurs sooner in time. Time $t_3$ occurs prior to time $t_2$, which occurs prior to time $t_1$, which is nominal time. To better illustrate, consider the case where CMOS logic typically employs a 50% threshold for signal detection or distinguishing low and high signals. Accordingly, signal 1000 is perceived by the input receiver to arrive earlier in time, e.g., $t_3$ or $t_2$, than nominal time, e.g., $t_1$. The arrival time of signal 1000 will be perceived to occur earlier and earlier as the transient noise on the power and ground rails increases. This shift in threshold voltage on input signals is referred to as pull-in. This shift earlier in time can reduce the setup margin time inherent in a circuit design.

In accordance with another embodiment of the present invention, the design tool can include, or have access to, a plurality of data sets. Each data set can correspond to a different type of timing degradation. For example, one data set can correspond to measurements taken for push-out, another for pull-in, another for rise time, and another for fall time. Each data set can be generated by observing behavior of an actual IC. The IC can be loaded with a circuit design that attempts to utilize as much of the IC as is possible in terms of logic blocks, I/O banks, and other circuit resources. With resource utilization tending toward the upper limits, the timing degradations observed will approximate a "worst case" scenario in terms of timing degradation. These values can be scaled lower according to actual and/or estimated resource usage as will be described herein in greater detail.

In another embodiment, the data set can be generated using a circuit design with minimal resource usage and, thus, approximate a "best case" scenario in terms of timing degradation. In that case, values obtained from the data set can be scaled upward according to actual and/or estimated resource usage. For example, the timing degradation characteristics for one CLB and/or one SSO driver may be determined. The timing degradation characteristics for one CLB and/or one SSO driver may be used to scale the timing degradation from the data set upward according to actual and/or estimated resource usage.

In any case, for each type of timing degradation, a particular reference clock frequency can be set. The level of resource utilization can be selected while observing the degradation affected. The data can be accumulated and stored within each respective data set according to the particular degradation being observed or measured. This data can be referenced by the design tool to predict and/or plan for push-out, pull-in, rise time, and/or fall time as explained with reference to FIGS. 11 and 12.

In general, the data reflects the timing degradation as reflected by the combination of clock frequency and resource utilization. Accordingly, when determining the effect of timing degradation, a lookup operation can be performed based on a combination of clock frequency and resource utilization. The results from the lookup operation may be scaled as described.

Figure 11:
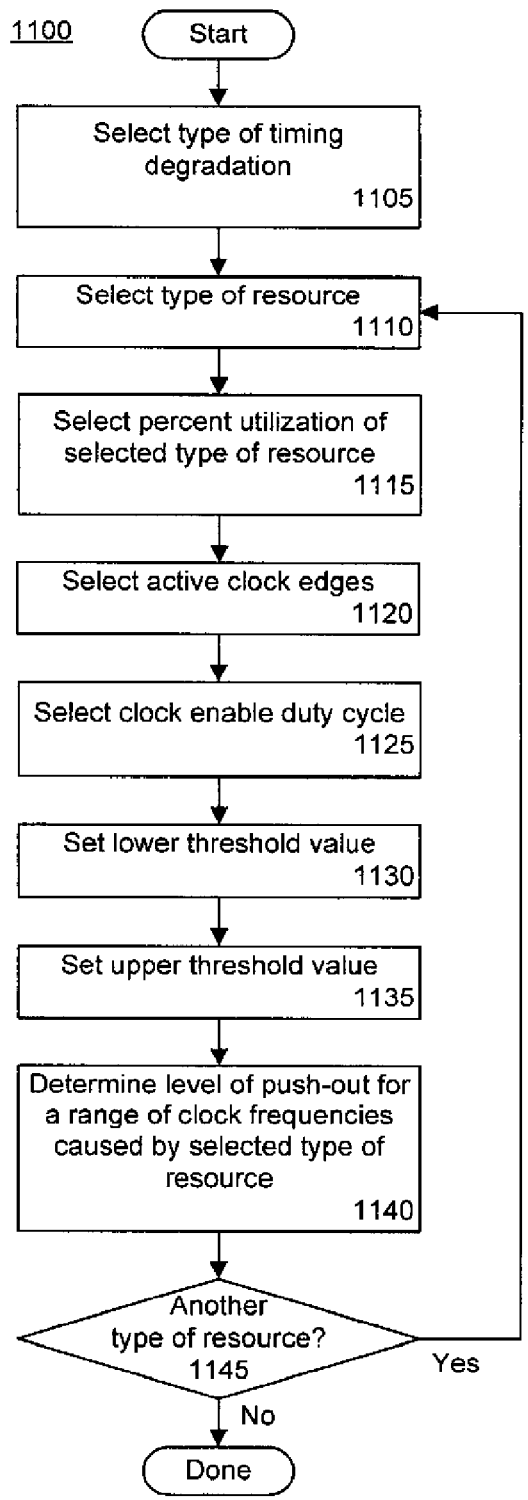
FIG. 11 is a flow chart illustrating a method of planning for timing degradations of data signals in accordance with another embodiment of the present invention.

FIG. 11 is a flow chart illustrating a method 1100 of planning for timing degradations for data signals in accordance with another embodiment of the present invention. Method 1100 can be implemented within a software-based circuit design tool as described. For example, method 1100 can be implemented by a planning module included within such a design tool. Method 1100 can predict the degree of timing degradation that may influence timing of data signals within a target IC for planning purposes, e.g., prior to actual specification of a circuit design.

Method 1100 of FIG. 11 illustrates a technique for predicting push-out, pull-in, rise time, and fall time. The method can be performed, for example, in cases where circuit configuration data is sparsely available. For instance, estimates of push-out, pull-in, rise time, and/or fall time can be provided using the parameters discussed without the need for more specific details relating to CLB usage, I/O usage, or the like. Rather, estimates of resource usage can be specified and the other parameters can be used. Further, method 1100 can reveal a qualitative level of one of such timing degradations according to frequency of a clock domain.

In step 1105, a type of timing degradation can be selected. The type of timing degradation can be one of push-in, pull-out, rise time, or fall time. Though change in rise time and fall time can be considered effects of push-out, for purposes of FIG. 11, each also may be considered a different type of timing degradation. The selected timing degradation further can select a particular data set that will be used or accessed in estimating the selected timing degradation. For purposes of illustration, push-out will be used in describing FIG. 11. As noted, however, push-out, pull-in, rise time, or fall time can be selected. Moreover, the method 1100 can be repeated to estimate a measure of each different type of timing degradation if so desired.

In step 1110, a type of resource can be selected for use in estimating the level of timing degradation that will be experienced. The type of resource can be selected to be CLBs or SSO, in reference to I/O banks and I/O bank utilization. For purposes of illustration, assume that CLB is selected as the type of resource. In step 1115, a percent utilization of CLBs can be specified or input.

In step 1120, the active clock edges can be selected. The active clock edge indicates, for example, rising, falling, or both. In step 1125, a clock enable duty cycle can be specified or input. In step 1130, a lower threshold value can be specified. The lower threshold value can be used in comparing estimated levels of push-out. In step 1135, an upper threshold can be specified. The upper threshold value can be used in comparing estimated levels of push-out as well. Accordingly, estimated levels of push-out falling below the lower threshold can be indicated as such. Estimated levels of push-out falling between the lower threshold and the upper threshold can be so indicated. Estimated levels of push-out that are above the upper threshold can be indicated as being above the upper threshold.

In step 1140, the level of push-out caused by the selected resource, e.g., CLBs, can be determined and output. In calculating the level of push-out, a value can be obtained from the data set corresponding to the selected type of degradation. This value can be scaled according to values provided as input, e.g., percent utilization of the resource, the clock enable duty cycle, active clock edges, or the like. For example, factors such as clock enable duty cycle and the active clock edge may influence the operational frequency of clocks used to index into the data set to determine timing degradation. Also in step 1140, a deviation susceptibility range can be determined. The deviation susceptibility range can indicate different frequency ranges for clocks in the circuit that will have the most effect, least effect, no effect, etc., upon data signals of the circuit design.

In step 1145, a determination can be made as to whether the contribution to the selected type of timing degradation from another type of resource is to be calculated. For example, continuing with the push-out example, since CLBs were initially selected, the method can repeat with SSO being selected in step 1110. The method 1100 can continue as described with the exception that the various parameters, e.g., percent utilization, low threshold, upper threshold, etc., may be specified for SSO. Thus, each type of resource can have its own set of parameters to be used in evaluating the contribution of that resource to the selected type of timing degradation. If no further resources remain to be processed, the method 1100 can end.

For circuit designs that are "registered," e.g., where the data signals from the internal CLBs are registered in the I/O block, as shown illustratively by path 507-1 through 501-1 to 503-1 in FIG. 5, push-out as perceived at the output of the device is caused only by the I/O block. The component of push-out that is attributable to CLBs is absorbed at the input of the I/O bank flip flop. For "non-registered" applications, as shown by path 507-1 to 503-1, however, where the signal from the CLB passes through the I/O bank without being registered, push-out is caused primarily by the worse of the CLB or the I/O block component.

It should be appreciated that other factors described herein, e.g., WASSO, may be applied as scaling factors. The scaling factors can be applied to individual components, e.g., to the contribution of each type of routing resource, or to a composite result determined by combining the contributions from both CLBs and SSOs.

Figure 12:
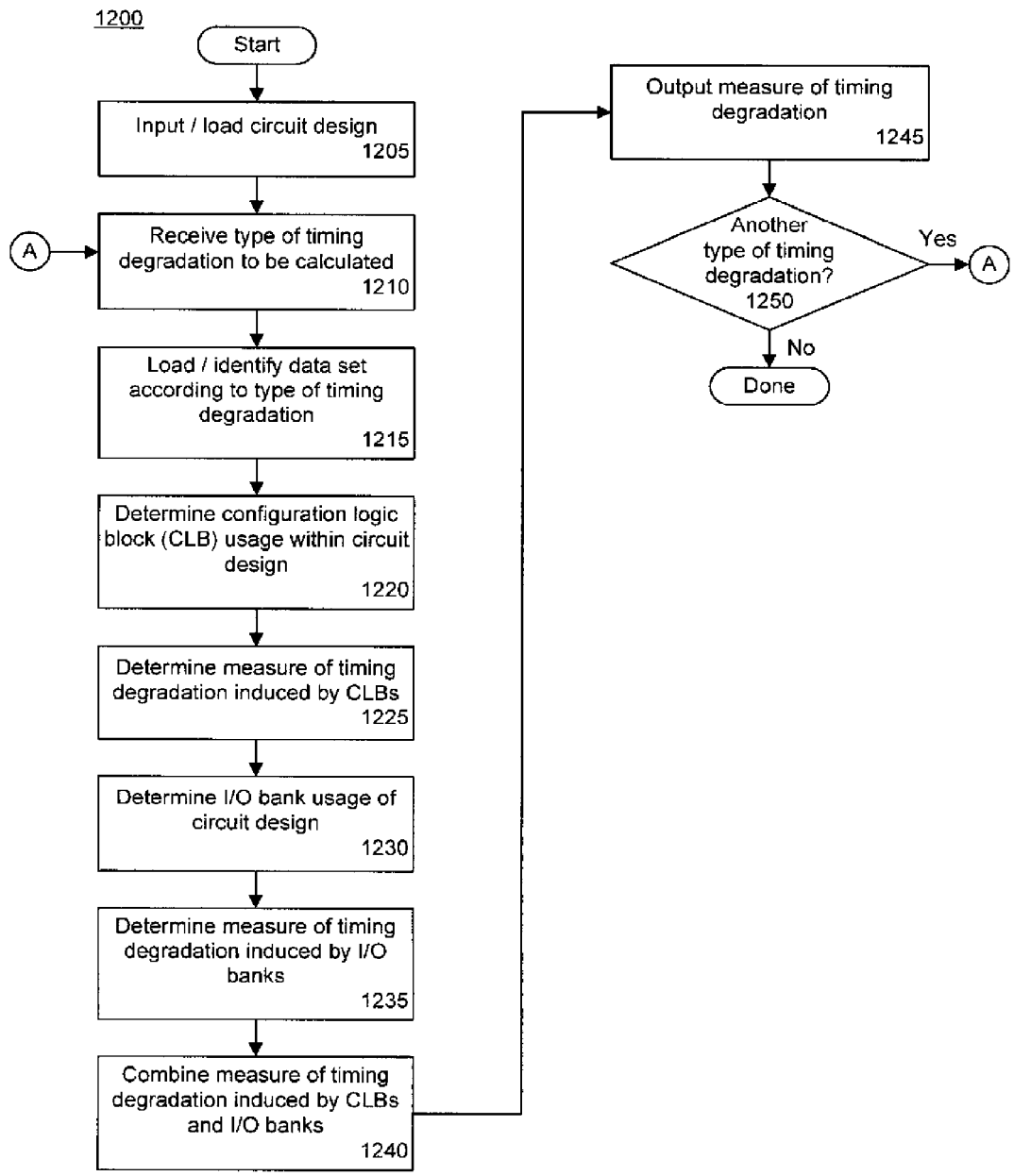
FIG. 12 is a flow chart illustrating a method of predicting timing degradations for data signals in accordance with another embodiment of the present invention.

FIG. 12 is a flow diagram illustrating a method 1200 of predicting timing degradations of data signals in accordance with another embodiment of the present invention. The method of FIG. 12 can be implemented within a circuit design tool, as discussed. For example, method 1200 can be implemented by a timing degradation prediction module.

The method 1200 can begin in step 1205 where a circuit design can be identified by and/or loaded into the design tool. As known, the circuit design can specify various parameters and configuration information for the circuit design. Such information can include, for example, descriptions of the various logic block configurations utilized within the circuit design, descriptions of I/O bank configurations utilized within the circuit design, or the like.

Examples of logic blocks of an FPGA can include CLBs, DSPs, BRAMs, embedded processors, among other known logic blocks. Logic block configuration information can specify parameters such as one or more of minimum and maximum clock frequencies, clock enable duty cycle, active clock edge rising or falling, number of flip-flops, among other details described herein.

I/O bank configuration information can include, for example, one or more of minimum and maximum clock frequencies, clock enable duty cycle, the type of flip-flop of the last output stage (such as "D" flip-flop or DDR flip-flop, among other known types of flip-flops), driver output type and slew rate, input receiver type and slew rate, output undershoot and overshoot, input undershoot and overshoot, output phase drift, output ground bounce limit, or output voltage tolerance, among other types of descriptor details described elsewhere herein.

In step 1210, a type of timing degradation to be predicted can be received by the design tool. For example, the input can specify whether a measure of push-out, pull-in, rise time, or fall time is to be calculated. In step 1215, a particular data set can be selected according to the specified type of timing degradation identified in step 1210.

In step 1220, the usage of CLBs within the circuit design can be determined. The number of CLBs that are part of the circuit design being evaluated can be determined. Usage can be expressed in terms of a percentage, for example, of total CLBs within the IC. For instance, if a given IC includes, for purposes of discussion, 10,000 CLBs, and 1,000 CLBs are used by the circuit design, e.g., programmed to be part of the circuit, CLB usage can be expressed as 10%, or 0.1.

In step 1225, a measure of timing degradation induced by the CLBs onto the data signals can be determined. In determining the measure of timing degradation, e.g., push-out for purposes of discussion, a value can be looked-up, or selected, from the data set corresponding to the selected type of timing degradation, e.g., push-out. The measure of push-out can be determined by indexing into the appropriate data set using the operational frequency of the reference clock and the level of resource utilization.

The measure of push-out obtained from the lookup operation reflects a worst case measure of push-out. As noted, values for the data sets can be collected with CLB usage of the IC at or near maximum levels to the extent possible. As CLB usage influences the amount of each given timing degradation, the measure of push-out, for example, determined can be scaled according to CLB usage. Taking the previous example, if CLB usage was 10% on the reference clock, the measure of timing degradation, in this case push-out, can be multiplied by a factor of 0.1.

As noted, in the case where the data set reflects a best case measure of push-out, any values determined may be scaled upward, rather than downward, according to CLB usage and/or SSO driver usage as the case may be.

In step 1230, the usage of I/O banks within the circuit design can be determined. The number of I/O banks that are used by the circuit design being evaluated can be determined. For example, the number of I/O banks of the target device that will send or receive signals as specified by the circuit design can be determined. Usage can be expressed in terms of a percentage, for example, of total I/O banks within the IC as was the case with respect to CLB usage.

In step 1235, the level of timing degradation induced by I/O banks onto data signals can be determined. As noted with respect to CLBs, the operating frequency of the reference clock and the utilization level of the I/O bank can be used to index into an appropriate data set corresponding to timing degradation for an IC. The data set used may be the same data set described with reference to CLB usage, for example. In any case, the measure of timing degradation induced by I/O banks onto data signals can be determined. This measure can be scaled according to I/O bank usage for the circuit design.

In step 1240, the measure of timing degradation determined according to CLB usage and I/O bank usage can be selected depending on whether the output register in the I/O bank is utilized. Alternatively, the timing degradation due to CLB usage and I/O bank usage can be combined using any of a variety of known summation techniques, e.g., weighted sums, straight addition, sum of squares, or the like.

In step 1245, the measure of timing degradation is output. As used herein, "outputting" and/or "output" can mean, for example, writing to a file, writing to a user display or other output device, playing audible notifications, sending or transmitting to another system, exporting, or the like. In step 1250, a determination can be made as to whether another timing degradation, e.g., push-out, pull-in, rise time, or fall time, is to be calculated. If so, the method can loop back to step 1210 to continue processing. If not, the method can end.

Figures 2, 13A:
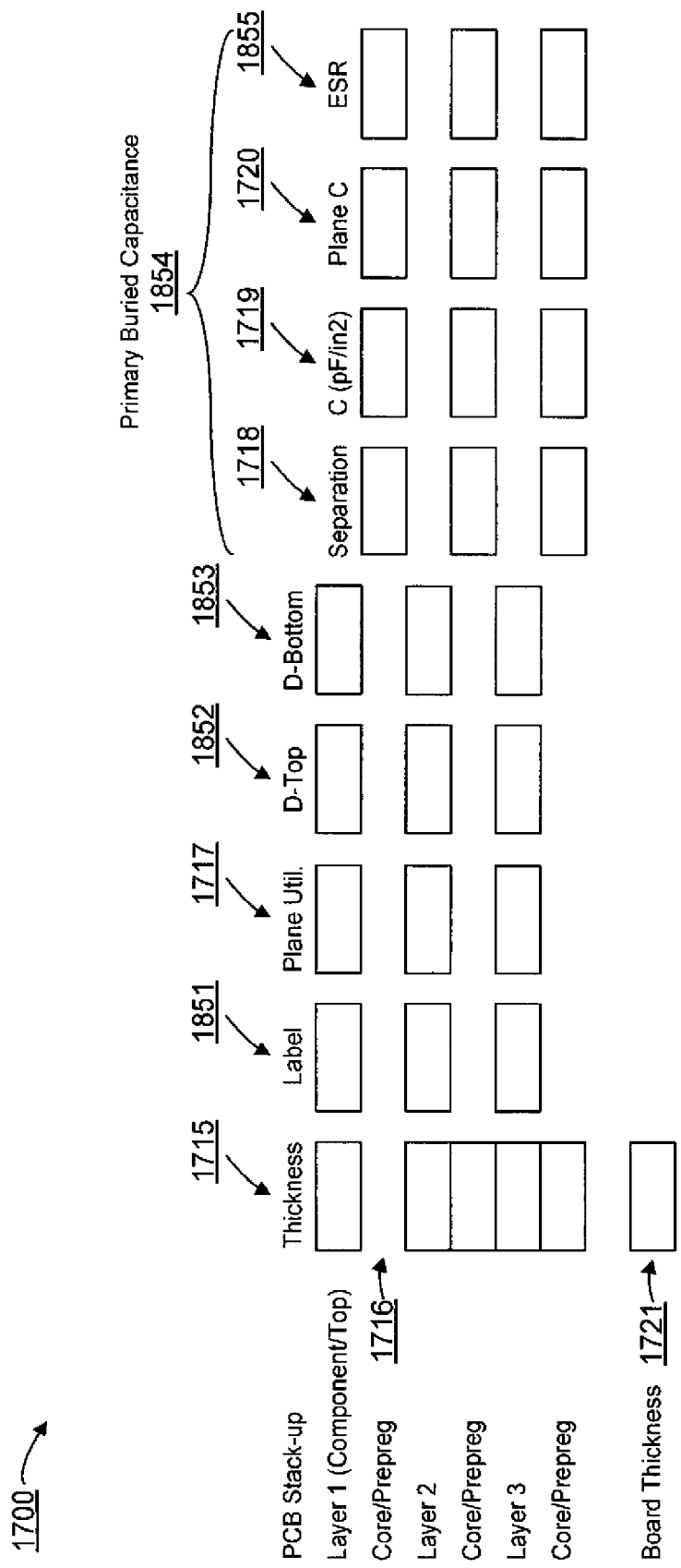
Figures 4, 13A:
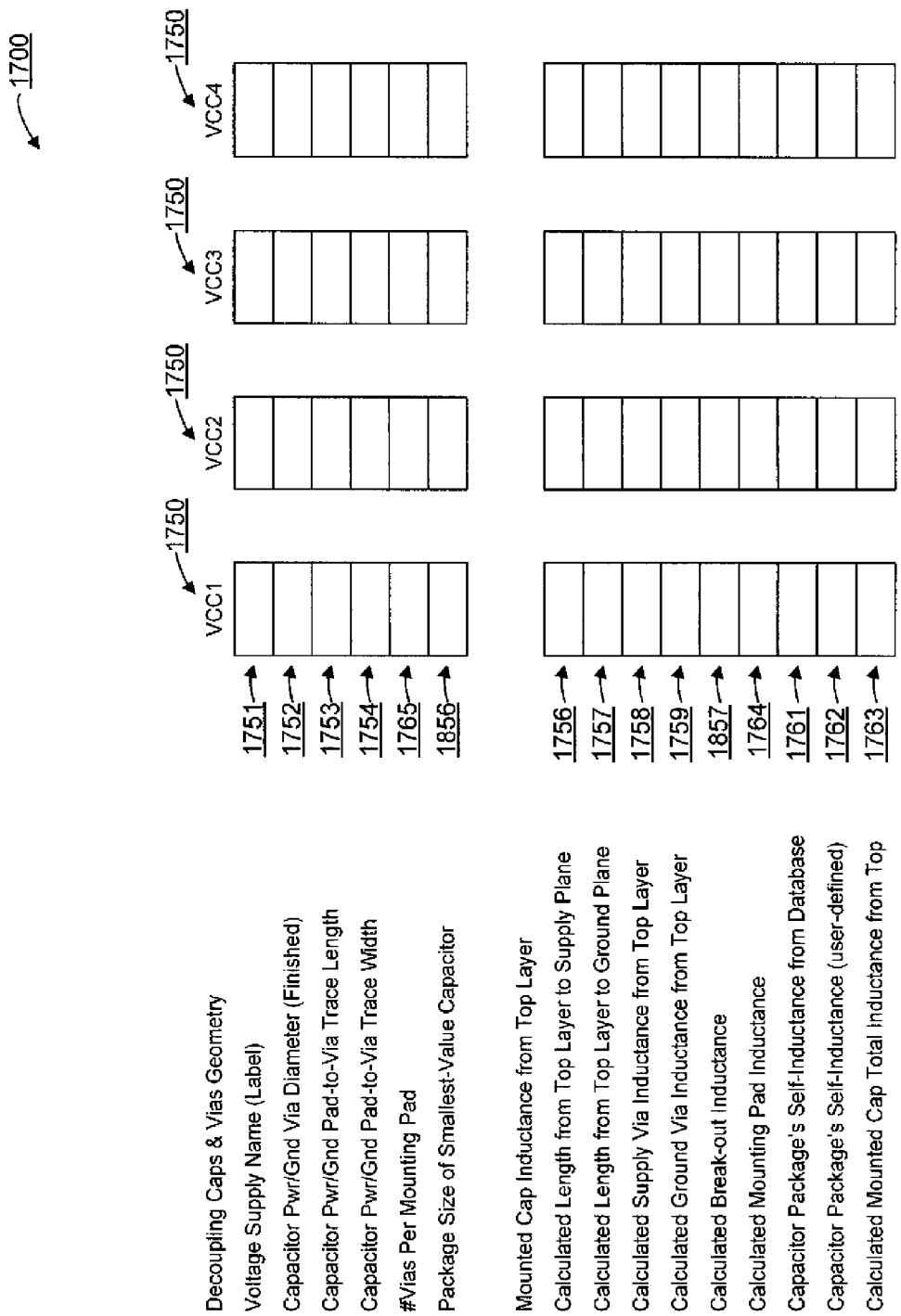
Figures 5, 13A:
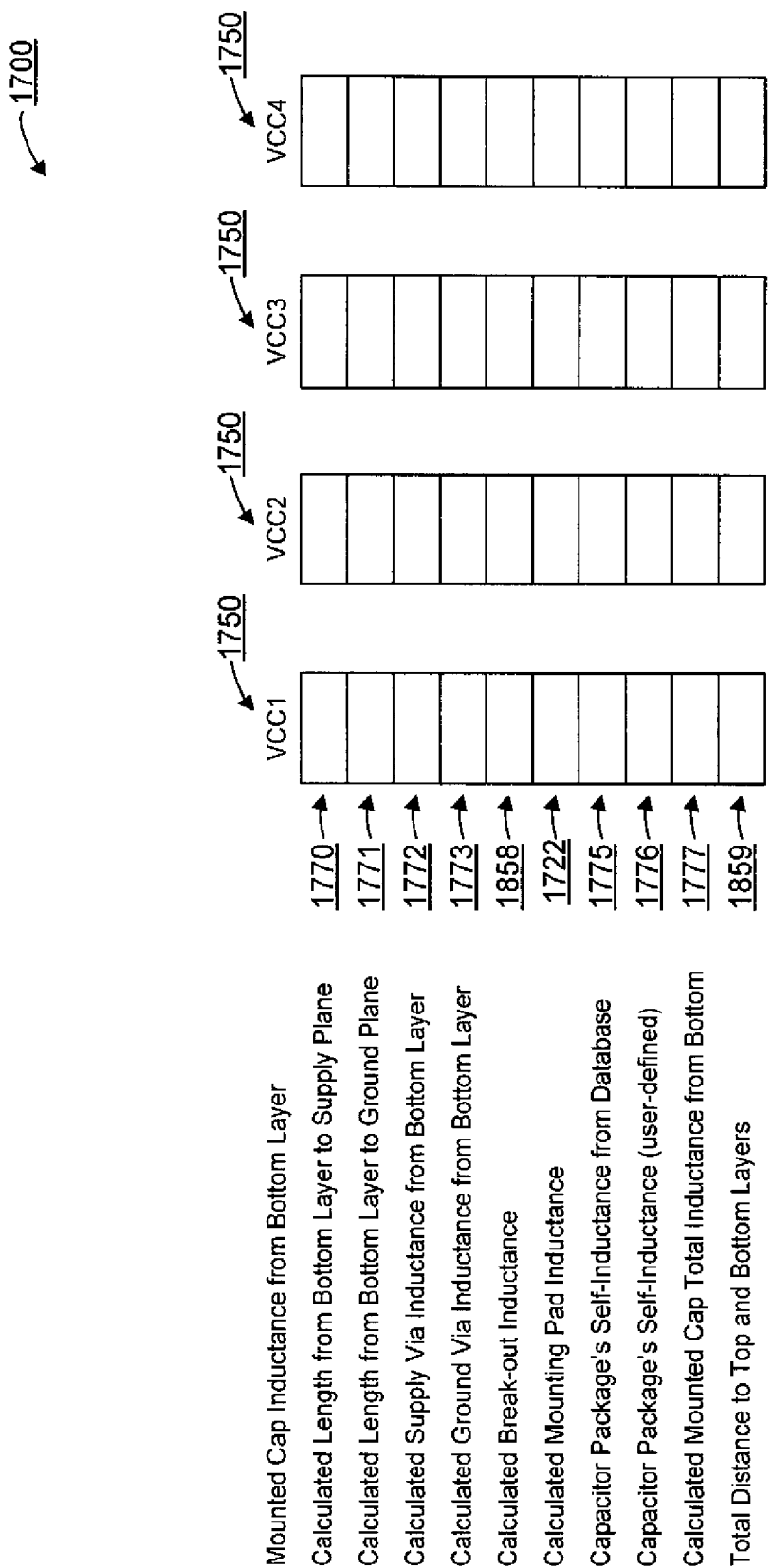
Figures 6, 13A:
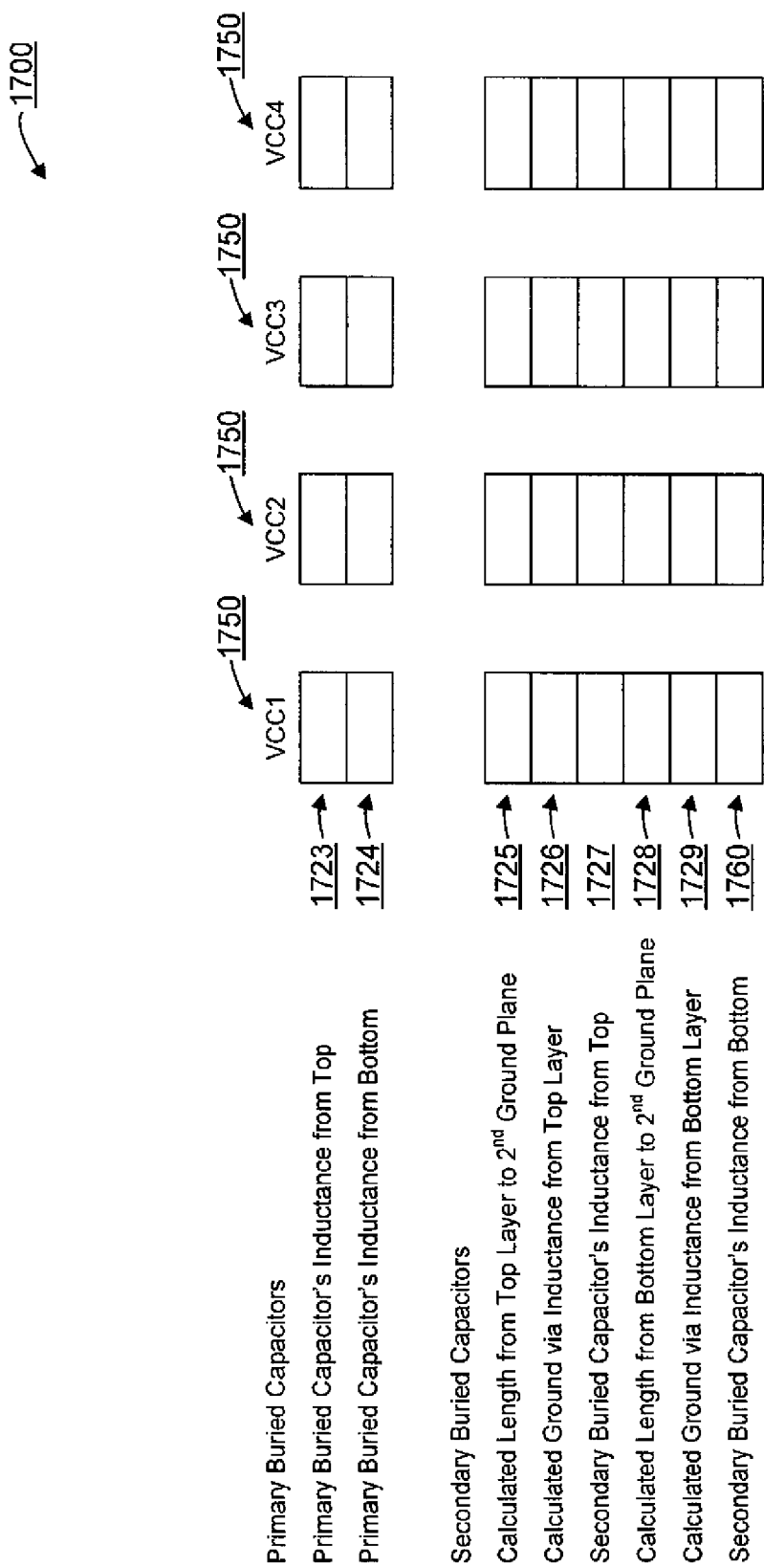
Figures 1, 13B:
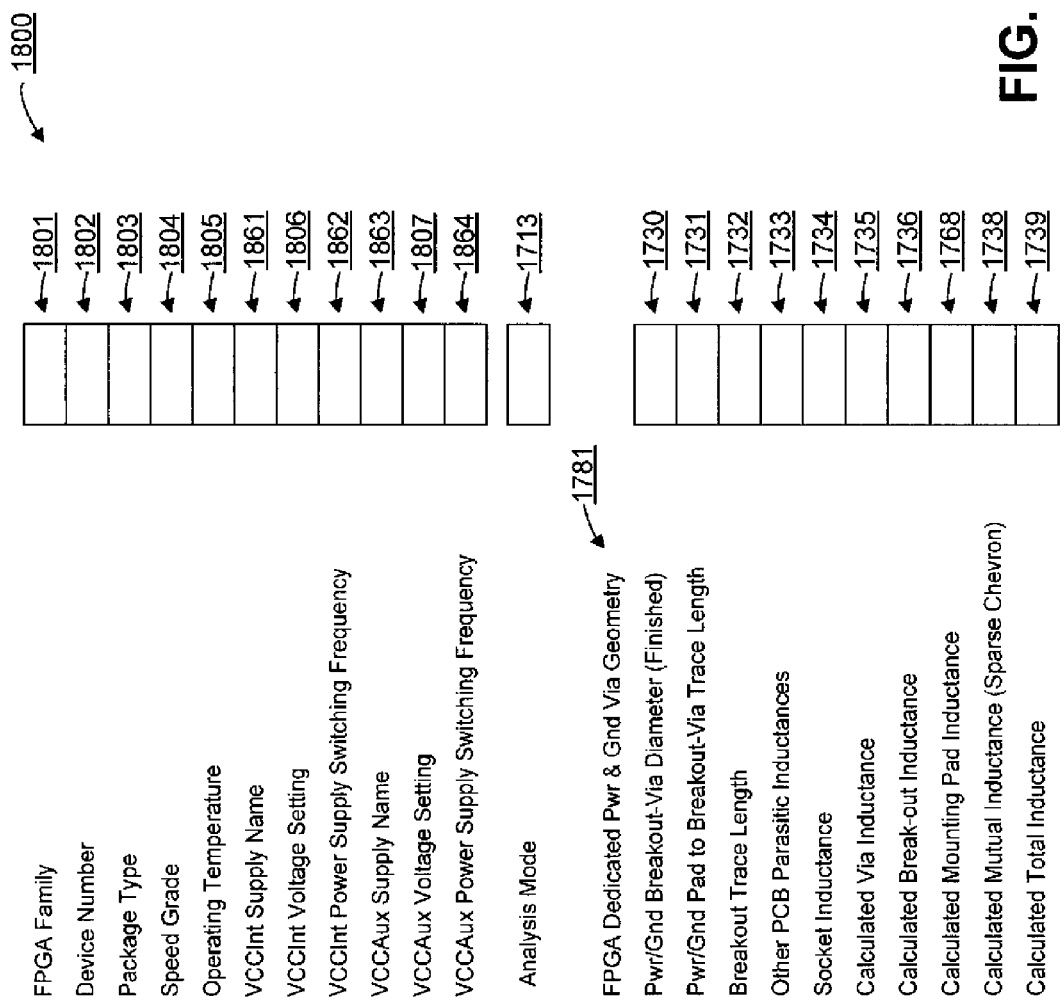
Figures 2, 13B:
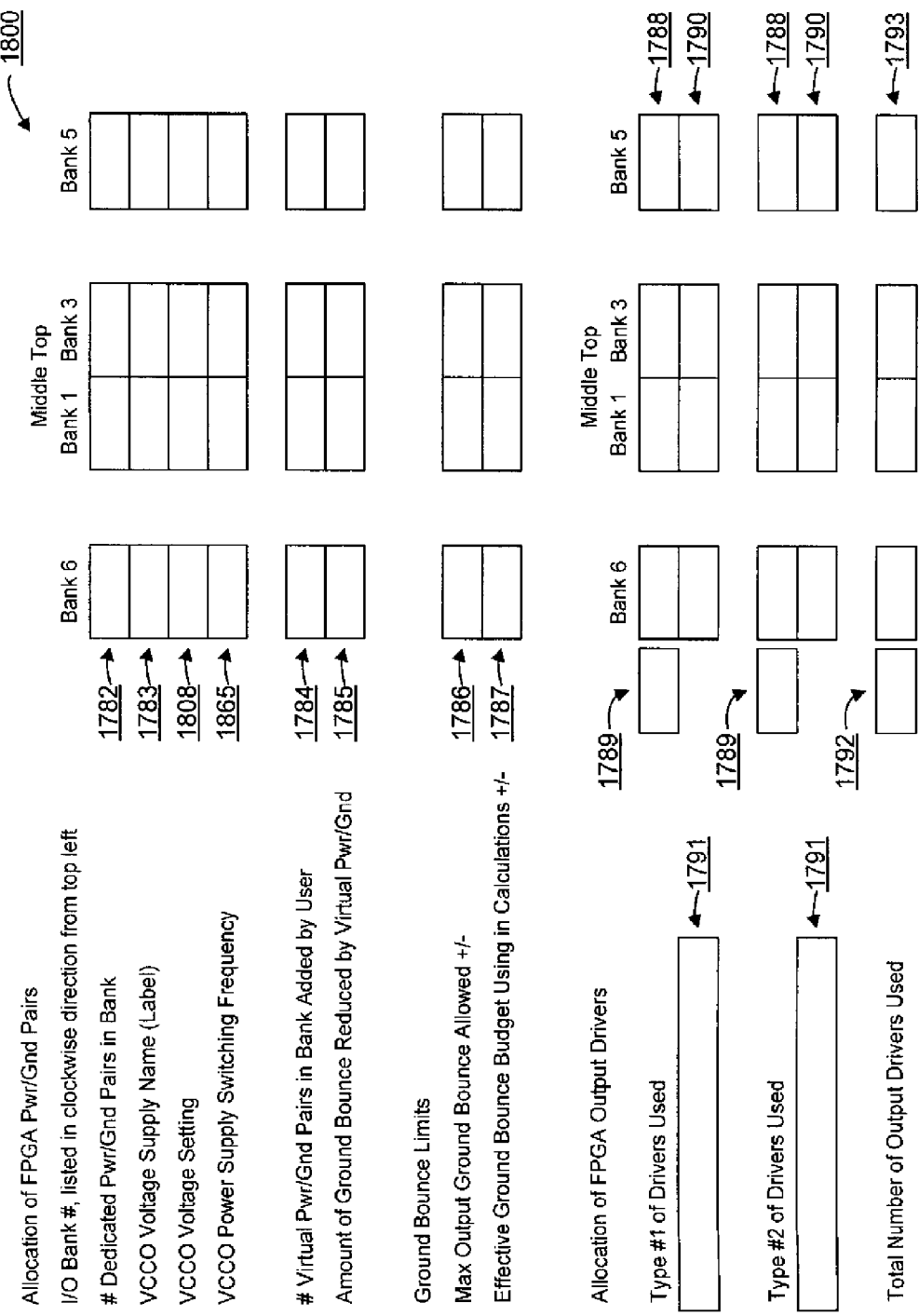
Figures 4, 13B:
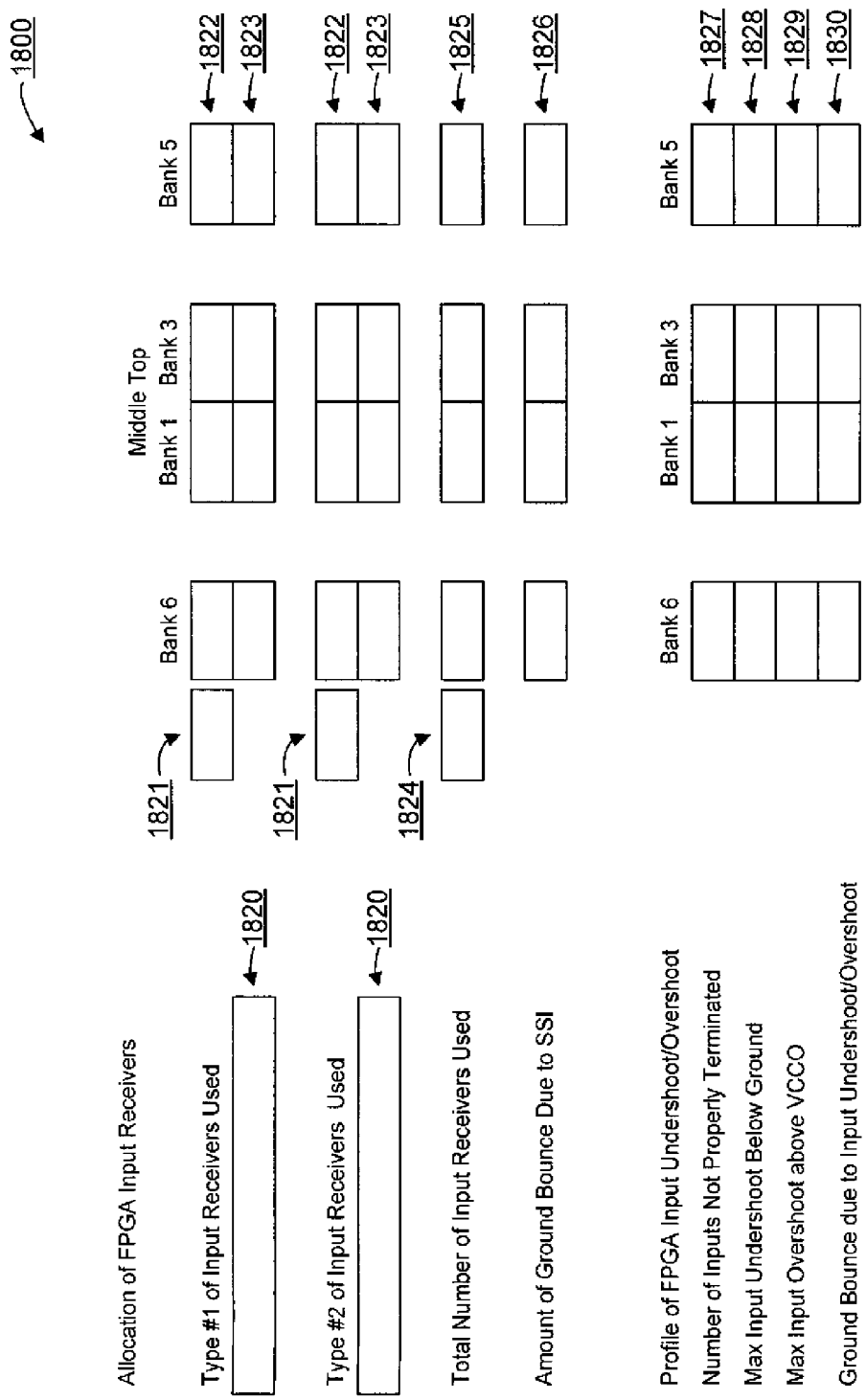
Figures 5, 13B:
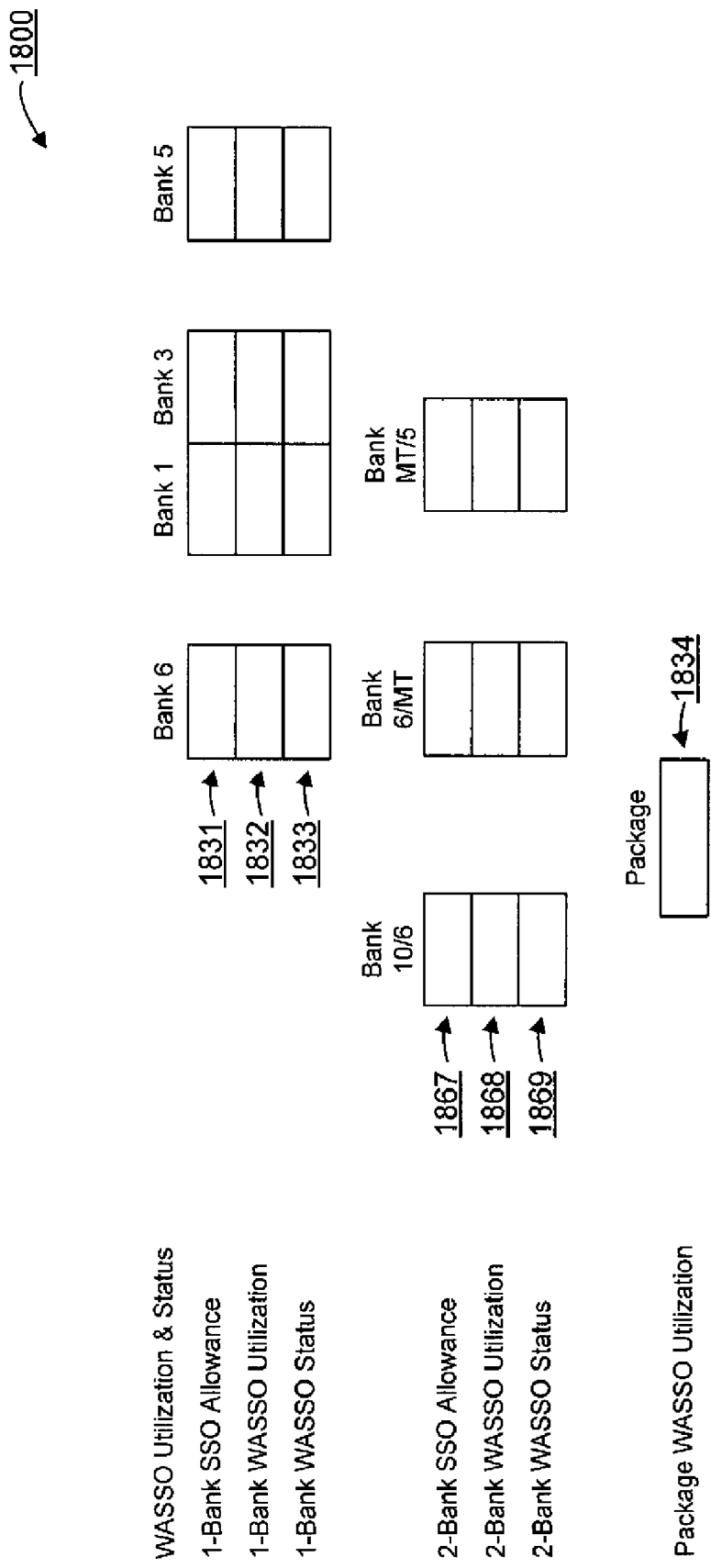
Figures 1, 13C:
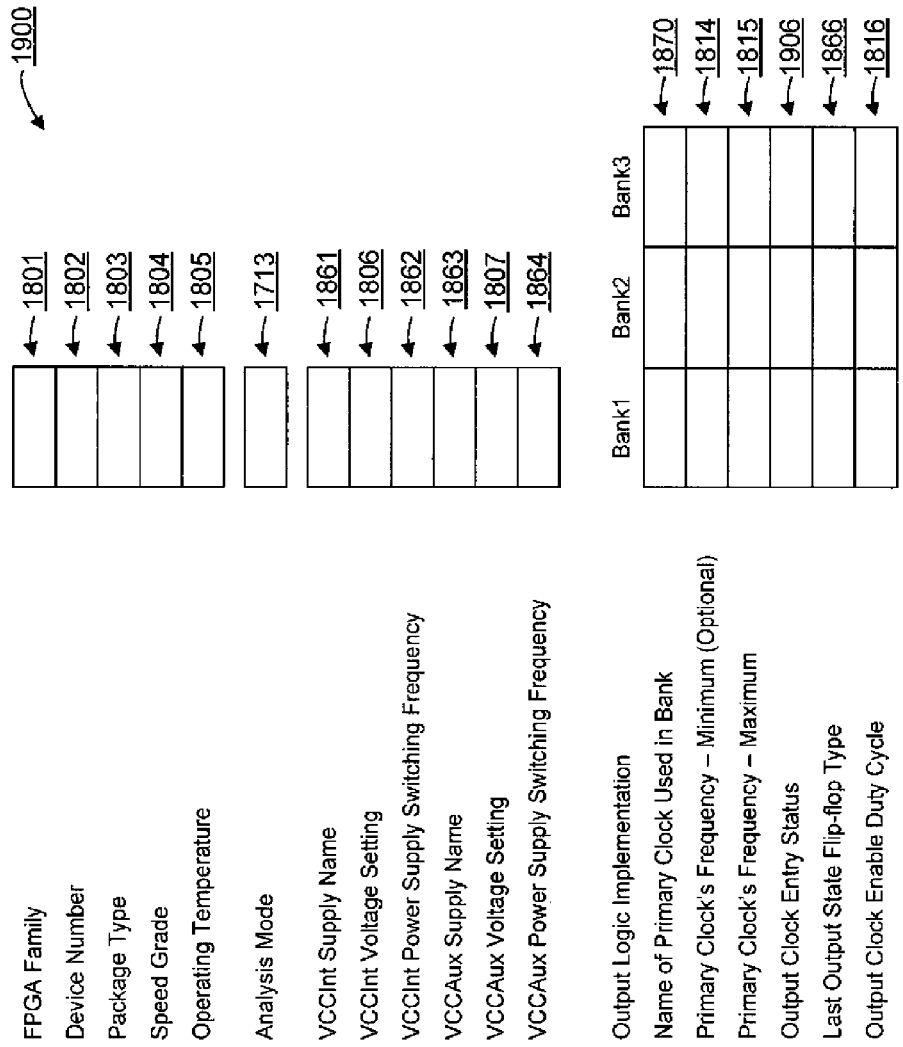
Figures 2, 13C:
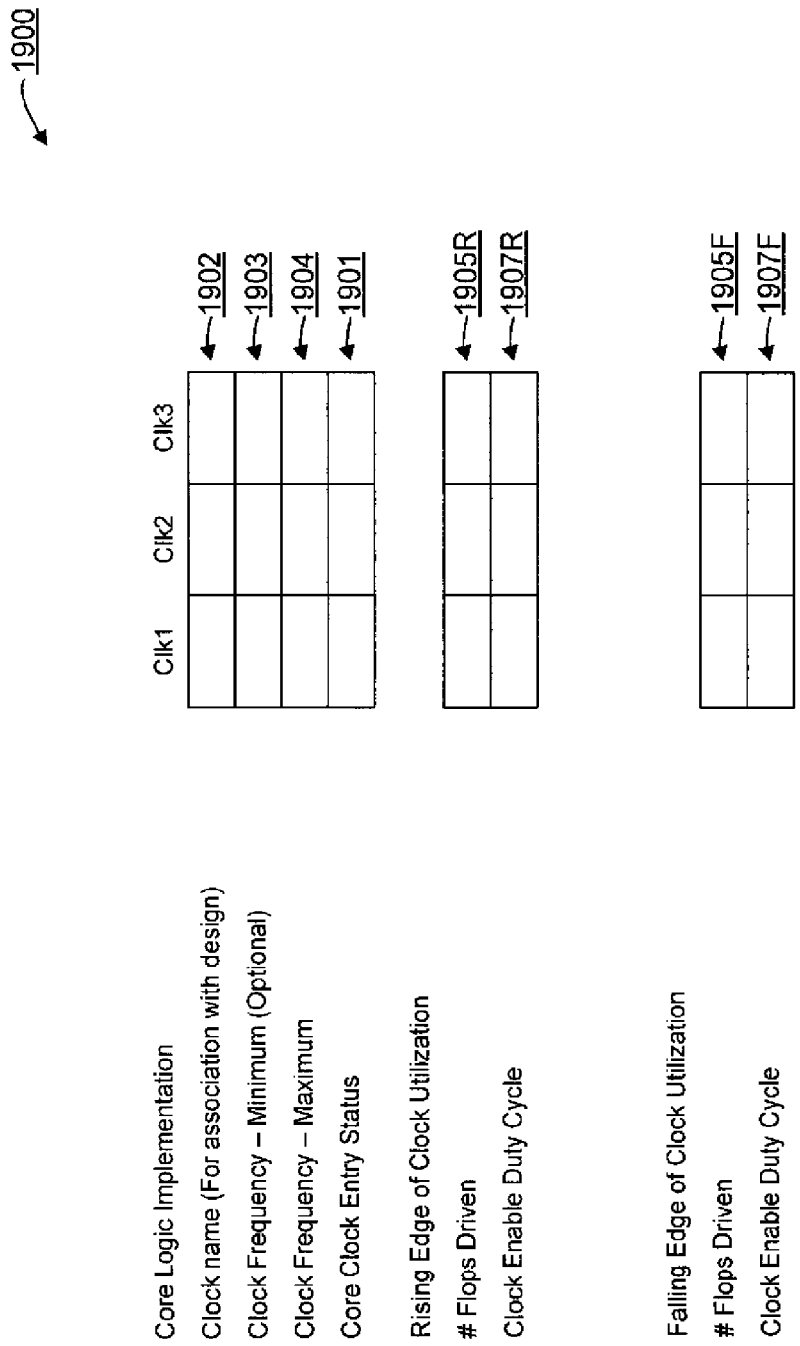
Figures 3, 13C:
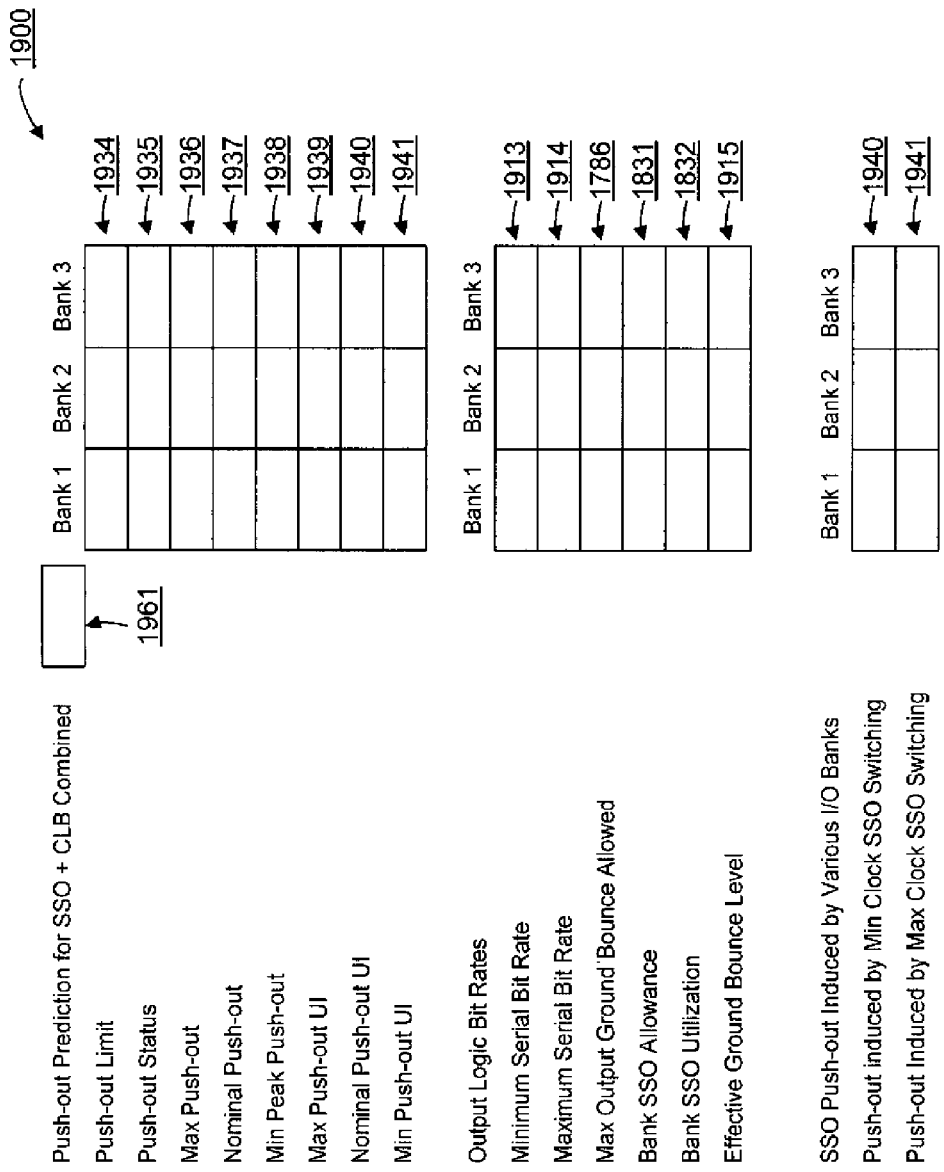

FIGS. 13A-13C, taken collectively, illustrate a user interface for an analysis tool in accordance with another embodiment of the present invention. While the analysis tool can be included as a module or component of a larger analysis tool or suite, e.g., an EDA tool, in another embodiment the analysis tool can be implemented as a spreadsheet having a plurality of data input fields. In any case, the user interface described with reference to FIGS. 13A-13C is presented as an exemplary interface and is not intended to limit the embodiments disclosed herein. Those skilled in the art will appreciate that other types of user interfaces, graphical controls, and/or user feedback mechanisms may be used.

FIGS. 13A-1 through 13A-6 are diagrams illustrating a visual interface for a circuit design tool in accordance with another embodiment of the present invention. More particularly, FIGS. 13A-1 through 13A-6 refer to a spreadsheet diagram depicting an exemplary embodiment of a PCB analysis portion 1700 of a user interface. Although a spreadsheet user interface is illustratively depicted in FIGS. 13A through 13C, it should be understood that other types of interfaces may be used, including other types of graphical user interfaces. However, for purposes of clarity in order to track the values and calculations derived from those values, an example of a spreadsheet is used.

Generally, the PCB module can analyze the stack-up, thickness, separation, material, via size, and other physical parameters of a selected PCB in order to determine the parasitic parameters associated with such PCB. Parasitics include via self-inductance, via mutual inductance, via break-out inductance, buried capacitance, and buried capacitor's Effective Series Resistance ("ESR") and Effective Series Inductance ("ESL"). Models that may be used include a one-dimensional "lumped" model, a two-dimensional finite element model, or a three-dimensional field solver model.

Detailed information about the construction of the PCB may be received from an interface to a PCB router, for example. Outputs that may be obtained from information of a PCB analysis module, and thus portion 1700, include: inductance of dedicated power and ground vias to a WASSO module, such as to analyze ground bounce; inductance of virtual power and ground vias to a WASSO module to analyze ground bounce optimization; mounted inductance of discrete capacitors for an ASNS module, such as to calculate discrete capacitance values; and buried capacitances and buried capacitors' ESR for ASNS module, such as to analyze combined power distribution system ("PDS") response between discrete and buried capacitances. Optionally, a switch that chooses between "What-If" and "Actual" modes may be used. A What-If mode allows the user to analyze the effect of PCB construction on parasitic inductances, capacitances, and ESR before committing to a particular PCB design. A What-If mode may be used by a user to optimize one or more parameters of a design. An Actual mode extracts implementation details from a PCB router database, and performs calculations for parasitics based on actual values. Thus, multiple calculations may be made for determining PDS response. Furthermore, mounting and via inductance of discrete capacitors to be mounted on a PCB may be accounted for, and response of the buried capacitors that are built into the PCB stack-up itself may be accounted for.

Examples of fields used for the above-described implementation details in a user interface for a PCB module are illustratively shown in PCB analysis portion 1700 of FIG. 17A. An analysis mode, such as either a What-If mode or an Actual mode, may be selected by a user in mode field 1713. A PCB physical description section 1701 includes fields for entering PCB parameters. Section 1701 may include one or more sets of power plane width field 1702, power plane length field 1703, ground plane width field 1704, and ground plane length field 1705. From input parameters associated with fields 1702 through 1705, area of one or more power and ground planes may be calculated for population in one or more fields 1706. Another parameter that may be entered is the type of PCB material in field 1707. A database of PCB materials may be provided for selecting a relative permittivity responsive to the PCB material input. Thus, relative permittivity field 1708 may be populated by access to a database. Additionally, permittivity of free space field 1709 may be populated with a known value. Volume resistivity field 1766 and loss tangent field 1767 may also be populated from such a database.

There may be multiple types of vias. In this particular example, only two types are illustratively shown but there may be more than two types, for example, ten types of vias. A user may indicate how many of each type, namely the number of vias of a type, in fields 1710 respectively associated with a type, and a user may indicate the diameter for each associated via type in fields 1711. Notably, via information for fields 1710 and 1711 may be provided by a PCB manufacturer. Accordingly, area field 1712 may be populated to indicate the total area of all vias of each particular via type. Additionally, a total number of layers field 1714 may be added for the number of layers connected to the same power supply. This added field may be used for the equivalent number of capacitors in calculating a PDS response.

Effective area of power and ground planes of a PCB may be used for determining the effective plane capacitances. Thus, each effective plane capacitance may be calculated for each of the types of vias, as respectively associated with via types 1 and 2. Inductance may be calculated based on the distance from each plane back up to an uppermost surface and again back down to a bottommost surface of a PCB. The distance from a plane to a nearest ground may be calculated as well. Notably, any calculated information need not be displayed as part of a user interface.

As is known, a PCB often is made up of multiple layers and one or more cores between layers. Thus, for example, a thickness of each respective layer may be input by a user in fields 1715. Additionally, a core, or prepreg, thickness may be input by a user in field 1716. A user may also indicate in plane utilization fields 1717 what the layer is used for, such as signals, ground, supply voltage, internal supply voltage, auxiliary supply voltage, or other type of voltage. A user may enter a label for the signal type in label fields 1851, such as a particular supply voltage, signal, ground, or other label. A distance to a top layer or a distance to a bottom layer relative to an integrated circuit die coupled to a PCB may be calculated and used to populate affected fields 1852 and 1853, respectively. Separation between layers may be calculated and populated in fields 1718; capacitance per square inch of the layer may be calculated and populated in field 1719. Additionally, overall plane capacitance may be calculated and populated in field 1720. Moreover, by summing the thicknesses input by a user, a total board thickness may be calculated and put in field 1721. An ESR value may be calculated for ESR field 1855. Fields 1718, 1719, 1720, and 1855 may be for a primary buried capacitance 1854. Additionally, another set of these buried capacitance fields may be generated for a secondary buried capacitance (not shown). Notably, some values for fields of this PCB module may be provided by a PCB manufacturer.

As is known, a PCB may have dedicated power and ground via geometries. Continuing the example of an FPGA, such geometries are described in section 1781. Power/ground break-out via diameters for a finished via may be input by a user in field 1730. Power/ground pad to break-out via trace length may be input by a user in field 1731. Break-out trace width may be input by a user in field 1732. The examples of user inputs described with respect to PCB analysis portion 1700 heretofore may all have been input based on design parameters created by a circuit designer or loaded in from a PCB database such as may be provided by a PCB manufacturer. However, other PCB parasitic inductances and socket inductance, as may be input in fields 1733 and 1734 respectively, are design parameters which a user would enter but which would not be obtainable from such a PCB database. From at least above described input to fields 1730 through 1732, via inductance may be calculated and populated in field 1735; break-out inductance may be calculated and populated in field 1736; mutual inductance may be calculated and populated in field 1738; mounting pad inductance may be calculated and populated in field 1768; and total inductance may be calculated and populated in field 1739. Notably, for this example, mutual inductance for field 1738 is for a Sparse Chevron package.

Notably, Grover's formulas and tables for calculating inductance may be used. Calculation for via inductance in field 1735 may be done according to:

$$L = 5.08 \times \text{(Board Thickness)} \times \left( \text{Ln}\left( \frac{4 \times \text{(Board Thickness)}}{\text{(Via Diameter)}} \right) - 0.75 \right) \quad (2)$$

Calculation for break-out via inductance in field 1736 may be done according to:

$$L = 5.08 \times (Brkout \text{ Length}) \times \left( \text{Ln}\left( \frac{4 \times (Brkout \text{ Length})}{(Brkout \text{ Length})} \right) - 0.75 \right) \quad (3)$$

Calculation for mutual inductance in field 1738 may be done according to:

$$L = 5.08 \times \text{(Board Thickness)} \times \quad (4)$$
$$\text{Ln}\left( \frac{\begin{array}{c}\text{(Distance from Signal Pin to Ground Pin)}\\ \text{(Distance from Ground Pin to } VCCO \text{ Pin)}\\ \text{(Distance from Signal Pin to } VCCO \text{ Pin)}\end{array}}{\text{(Radius of Ground Pin)}} \right)$$

Total via inductance in field 1739 may be done by calculating the sum of the results populated in fields 1735 through 1737 minus the result populated in field 1738.

In addition to dedicated power and ground via geometry, an FPGA, as well as other types of integrated circuits, may have virtual power and ground via geometries. Accordingly, a user may input virtual power/ground break-out-via diameter for a finished via in field 1740, and may enter virtual power/ground pad to break-out-via trace length in field 1741. A user may further enter virtual power/ground pair break-out trace width in field 1742. With respect to fields 1740 through 1742, these values may be user-designed values or may be obtained from a PCB database as provided by a PCB manufacturer, for example. Additionally, user-designed parameters generally not available in a PCB database provided by a manufacturer may be entered, including virtual power/ground pair trace inductance field 1743 and socket inductance field 1744. From these virtual power and ground via geometries input at least to fields 1740 through 1742, via inductance may be calculated and populated in field 1745; break-out inductance may be calculated and populated in field 1746; mounting pad inductance may be calculated and populated in field 1769; and total inductance may be calculated and populated in field 1748.

With respect to dedicated power and ground via geometries, as mentioned above, a Sparse Chevron pattern may be used in an FPGA package, for example, as well as other types of integrated circuit die. If such a pattern is selected, then mutual inductance may be subtracted out.

For decoupling capacitors and associated via geometries, there may be more than one supply voltage for an integrated circuit. Alternatively, there may be only one supply voltage for an integrated circuit. However, assuming there are multiple supply voltages, then there may be multiple supply voltage sets of fields, such as the example of sets of fields 1750. Although an example four sets of fields 1750 are used here, it should be appreciated that fewer or more sets of supply voltage field sets 1750 may be present. A supply voltage name label may be entered in fields 1751. Examples of such names may be VCC Internal, VCC Auxiliary, 3.3V, 1.8V, among other known types of supply voltage levels. Capacitor power/ground via diameter for a finished via may be input to fields 1752, and capacitor power/ground pad-to-via trace length as well as capacitor power/ground pad-to-via trace width may be respectively input by a user in fields 1753 and 1754. The number of vias per mounting pad can be entered in field 1765. In fields 1856, a user may input the package size of the smallest-value capacitor, or in other words of the capacitor having the least capacitance, that may be used for each supply voltage These values may be same for each set of supply voltage fields, although they need not be; they may be different values depending on the supply voltage. From the values input either directly by a user or obtained from a PCB database for fields 1751 through 1754, mounted capacitance inductance from a top layer and mounted capacitance inductance from a bottom layer may be calculated as described below.

Mounted capacitance inductance from a top layer may include a calculation of a length from a top layer to a supply plane which value may be populated in fields 1756. Length from a top layer to one or more ground planes may be calculated and populated in fields 1757. Supply via inductance from a top layer may be calculated and populated in fields 1758. Ground via inductance from a top layer may be calculated and populated in fields 1759. Calculated break-out inductance for a top-mounted capacitor may be used to populate fields 1857. Calculated mounting pad inductance may be used to populate field 1764. A capacitor package's self-inductance may be obtained from a database and populated in fields 1761. The capacitor package's self-inductance as defined by a user may be populated in fields 1762. Mounted capacitance total inductance from a top layer may be calculated and populated in fields 1763. Notably, a capacitor package's self-inductance may be obtained from a database having values from different manufacturers in order to select a capacitor meeting the target value.

Accordingly, inductances may be calculated for each supply voltage set of data.

For mounted capacitor inductance from a bottom layer, length from a bottom layer to a supply plane may be calculated and populated in fields 1770. Additionally, length from a bottom layer to one or more ground planes may be calculated and populated in fields 1771. Supply via inductance from a bottom layer may be calculated and populated in fields 1772. Ground via inductance from a bottom layer may be calculated and populated in fields 1773. Calculated break-out inductance for a bottom-mounted capacitor may be used to populate fields 1858. Calculated mounting pad inductance can be used to populate fields 1722. A capacitor package's self-inductance may be obtained from a database from one or more manufacturers as previously described and populated in fields 1775. The capacitor package's self-inductance as defined by a user may be calculated and populated in fields 1776. Mounted capacitor total inductance from a bottom layer may be calculated and populated in fields 1777. Optionally, a total distance to top and bottom layers may be calculated as a check value and populated in fields 1859.

For primary buried capacitors, the inductance of the primary buried capacitor from a top layer may be calculated and populated in fields 1723. An inductance of the primary buried capacitor from a bottom layer may be calculated in fields 1724. For secondary buried capacitors, a length from the top layer to the second ground plane can be calculated and populated in fields 1725. Ground via inductance from the top layer may be calculated and populated in fields 1726. The inductance of the secondary buried capacitor from the top layer may be calculated and populated in fields 1727. The length from the bottom layer to the second ground plane may be calculated and populated in fields 1728. The inductance of the ground via from the bottom layer may be calculated and updated in fields 1729. Finally the inductance of the secondary buried capacitor from the bottom layer may be calculated and populated in fields 1760.

Accordingly, it should be appreciated from the above-described PCB analysis portion 1700 that depending on where a decoupling capacitor is mounted, there may be a different conductance or inductance, such as mounting on a top layer versus mounting on a bottom layer. Additionally, it should be appreciated that landing or mounting pads of a PCB which conventionally have brake-out vias have an impact on inductance. These brake-out vias may extend to a plane such as a power plane or a ground plane of the PCB, or may extend to a brake-out trace for coupling to another mounting pad via another brake-out via of the PCB. Moreover, as is known, CAD interface tools may be used to select particular parts, and thus associated databases provided by manufacturers for those parts may be imported into a user interface as described herein via such CAD interface tool.

FIGS. 13B-1 through 13B-5 collectively refer to a spread sheet diagram depicting an exemplary user interface 1800 that can be used with a WASSO analysis module. A device family, which in this example is an FPGA family, may be specified in field 1801. Notably, once this device is specified by a user, it may be propagated in other locations of a user interface. This is also true with respect to a user specifying a device number in field 1802, a package type in field 1803, a speed grade in field 1804, and an operating temperature in field 1805. Notably, IC configuration information as may be obtained from a manufacture of such a part may be used as described herein. Speed grade input in field 1804 may be used to account for slight variation in ground bounce due to speed grade, such as a result of semiconductor process variation for example, based on manufacturer's characterization data. Alternatively or in addition to speed grade, slight variations in semiconductor processing may be determined through other means such as curves, graphs, or calculations.

Operating temperature and voltage for each of supply voltage level (rail) may be used to account for slight variation in ground bounce based on manufacturer's characterization data. Differences in temperature may be accounted for in scaling factor percent variation or mV of ground bounce per degree Celsius (C). Differences in supply voltages may be accounted for in scaling factor percent variation or mV of ground bounce per mV of supply voltage variation. Moreover, differences caused by variation of temperature or supply voltage may be as determined by manufacturer's characterization data or through other means such as curves, graphs, or calculations.

Voltage parameters which may be entered by a user include Vcc internal supply name, voltage setting, and power supply switching (ripple) frequency for entry in fields 1861, 1806, and 1862, respectively. Other voltage parameters that may be entered by a user include Vcc auxiliary supply name, voltage setting, and power supply switching frequency for entry in fields 1863, 1807, and 1864, respectively. WASSO analysis portion 1800 may include an analysis mode field 1713. As described above, the What-If mode allows a user to do I/O pinout assignment before committing to a hardware implementation of a design. Implementation details may be extracted from a PCB routing database and an Integrated Software Environment (ISE) database respectively associated with, for example, a PCB router and/or FPGA design and router tool, and SSO calculations may be performed based on the values of the implementation details extracted.

As is known, a PCB may have dedicated power and ground via geometries. Continuing the example of an FPGA, such geometries are described in section 1781. Power/ground break-out via diameters for a finished via may be input by a user in field 1730. Power/ground pad to break-out via trace length may be input by a user in field 1731. Break-out trace width may be input by a user in field 1732. The examples of user inputs described with respect to section 1781 may all have been input based on design parameters created by a circuit designer or loaded in from a PCB database such as may be provided by a PCB manufacturer. However, other PCB parasitic inductances and socket inductance, as may be input in fields 1733 and 1734 respectively, are design parameters which a user would enter but which would not be obtainable from such a PCB database. From at least above described input to fields 1730 through 1732, via inductance may be calculated and populated in field 1735; break-out inductance may be calculated and populated in field 1736; mounting pad inductance may be calculated in field 1768; mutual inductance may be calculated and populated in field 1738; and total inductance may be calculated and populated in field 1739. Notably, for this example, mutual inductance for field 1738 is for a Sparse Chevron package.

Grover's formulas and tables for calculating inductance may be used. Calculation for via inductance in field 1735 may be done according to:

$$L = 5.08 \times (\text{Board Thickness}) \times \left( \text{Ln} \left( \frac{4 \times (\text{Board Thickness})}{(\text{Via Diameter})} \right) - 0.75 \right) \quad (2)$$

Calculation for break-out via inductance in field 1736 may be done according to:

$$L = 5.08 \times (Brkout \text{ Length}) \times \left( \text{Ln} \left( \frac{4 \times (Brkout \text{ Length})}{(Brkout \text{ Length})} \right) - 0.75 \right) \quad (3)$$

Calculation for mutual inductance in field 1738 may be done according to:

$$L = 5.08 \times (\text{Board Thickness}) \times \quad (4)$$
$$\text{Ln} \left( \frac{(\text{Distance from Signal Pin to Ground Pin})\frac{(\text{Distance from Ground Pin to } VCCO \text{ Pin})}{(\text{Distance from Signal Pin to } VCCO \text{ Pin})}}{(\text{Radius of Ground Pin})} \right)$$

Total via inductance in field 1739 may be done by calculating the sum of the results populated in fields 1735 through 1737 minus the result populated in field 1738.

As is known, an FPGA has banks of pins. The number of banks may vary from FPGA to FPGA. Allocation of FPGA power/ground pairs is described below with reference to four exemplary banks, namely banks 1, 3, 5, and 6; other banks may be included but are excluded here for purposes of clarity as they would just be repetitive. Additionally, it should be appreciated that a middle top is specified for the combination of banks 1 and 3. A middle bottom of two other banks may be used. Notably, I/O bank number in this example is listed in a clockwise direction from the top left of an FPGA.

The number of dedicated power and ground pairs in a bank may be displayed in fields 1782, and these values may be obtained based on the FPGA family and device specified as well as the package type. Use device family, part number, and package number may be obtained from an ISE database, such as associated with FPGA design and router tool, to automatically look up the number of dedicated power/ground pairs per bank for fields 1782.

VCCO supply name label, voltage setting, and power supply switching frequency may be provided by a user in fields 1783, 1808, and 1865, respectively. Examples of names of supply voltage levels for fields 1783 may be 5V, 3V, 8V or other known supply voltage designation. This facilitates associating a bank with a power supply plane in the PCB stack-up, which may be used to determine the buried capacitance of such plane. Additionally, this association may be used to determine interaction with a discrete capacitor network mounted on a PCB for determining an overall PDS response.

The number of virtual power and ground pairs in a bank added by a user may be specified by a user in fields 1784 for each affected bank. The amount of ground bounce reduced by a virtual power/ground pair may be calculated and populated in fields 1785 for each affected bank. Fields 1785 report the amount of ground bounce reduced by virtual power/ground pins that are implemented by tying I/O pins directly to either ground or VCCO on a PCB. These pins may be configured as strong/fast output drivers by an FPGA configuration bitstream. The amount may be determined from manufacturer's characterization data or through other means such as calculations, graphs, and the like.

Ground bounce limits may be specified as well as calculated. For example, a maximum output ground bounce allowed may be specified by a user in fields 1786 for each bank. The effective ground bounce budget used in calculations may be determined and populated in fields 1787. Notably, the allocation of FPGA power and ground pairs is used to determine 1-Bank WASSO Utilization.

Allocation of FPGA output drivers may be specified by a user or loaded from an ISE database such as may be available from an FPGA vendor for example and associated with FPGA design and router tool. There may be a number of output driver standards supported and any or some subset of such output drivers standards supported may be used. In this particular example, two types of output drivers are specified though fewer or more than two types of output drivers may be specified by either a user or loaded in from an ISE database. The number of drivers in each bank that are used may be indicated in fields 1788, and the total number of a type of driver for all banks may be specified in fields 1789. The type of output drivers used in a bank may be chosen depending on the type of interface input by a user or obtained from an ISE database as indicated in fields 1791; the number of those drivers allowed per power/ground pair is indicated in fields 1790. The total number of output drivers may be calculated for all banks as well as for each bank and placed in fields 1792 and 1793 respectively. Content of each field 1790 may be obtained by looking up an SSO number associated with the output standard type selected. Otherwise, a user may enter an SSO number directly into each field 1790.

Profile of FPGA output undershoots/overshoots is described in the next section of WASSO analysis portion 1800. Again, the example banks 1, 3, 5, and 6 as described above are used, though other banks may be used. The number of outputs not properly terminated for each affected bank may be a user design parameter specified in fields 1794, and the maximum output undershoot below ground may be specified by a user in fields 1795 for each affected bank. The maximum output overshoot above VCCO may be specified in fields 1796 for each affected bank. The amount of ground bounce due to output undershoot/overshoot is calculated and populated in fields 1797 for each affected bank. Notably, a visual indicator flag may be used if a number is excessive. The amounts populated in fields 1797 may be determined by manufacturer's characterization data based on parameters in fields 1794 through 1796. Alternatively, the amount of ground bounce induced by output undershoot/overshoot may be determined through other means such as curves, graphs, calculations, and the like.

A profile of FPGA output phase shifting may be input by a user for calculating the amount of ground bounce reduced by phase shifting. Accordingly, a user may input a number of output bits phase shifted in fields 1798 for each affected bank and may input the amount of phase shift relative to an output clock edge in fields 1799 for each affected bank. The amount of ground bounce reduced by phase shifting may be used to populate fields 1809 for each affected bank. The amounts shown in fields 1809 may be determined by manufacturer's characterization data based at least in part on the amount of phase shift and the output standard type. Alternatively, the amount of ground bounce reduced by phase shifting may be determined through other means such as calculations, graphs, and the like.

A profile of FPGA output capacitive loading may be determined next. The number of loads per driver may be entered for each bank by a user in fields 1810 for each affected bank. In fields 1811, capacitance per load for each affected bank may be entered by a user. Generally a user will use the largest value for populating fields 1810 and 1811. A user may enter a Manhattan distance to a nearest load and a Manhattan distance to a farthest load in fields 1812 and 1813 respectively. A user may specify a name of a primary clock used in each bank in fields 1870. A minimum primary output clock frequency may optionally be specified by a user and placed in field 1814 for each affected bank. A maximum primary output clock frequency may be specified by a user or may be obtained from an ISE database and loaded into fields 1815 for each affected bank. A user may specify an output clock enable duty cycle in fields 1816 for each affected bank, and may specify whether a single or double data rate is used in fields 1817 for each affected bank. The type of flip-flop, such as a delay (D), DDR, or other known type of flip-flop, used for a last output stage may be input by a user or loaded from an ISE database to populate fields 1866. Load capacitance per output driver may be calculated and populated in fields 1818 for each affected bank. An effective capacitance derating factor may be calculated for each affected bank and placed in fields 1819.

The parameters shown in the fields for the above-described profile of FPGA output capacitive loading are used to determine the effect of capacitive loading on ground bounce on an mV/pF basis, as determined from the manufacturer's characterization data. Capacitive loading may be determined from manufacturer's characterization data, which results in a different derating amount that reflects the operating condition as determined by the parameters in allocation of FPGA input receivers fields described below. This derating factor can also be determined through other means such as calculations, graphs, and the like. As part of determining the derating factor for capacitive loading, an output clock enable duty cycle of field 1816 accounts for whether the output switches at full clock speed or at sub-harmonic thereof. If a DDR register is used as may be indicated in field 1817, the clock frequency may be multiplied by two to account for the effective data rate. In addition, distance to the load(s), output clock frequency, and total load capacitance per driver may be taken into account to closely approximate the effect of loads on ground bounce.

Allocation of FPGA input receivers may be specified. Notably, there may be some number of input receiver standards supported. The type of input receivers used may be specified by a user or obtained from an ISE database and loaded in fields 1820 for each affected bank. The total number of each type of such receiver may be determined and placed in fields 1821. The number of each type of receiver, or input driver, as specified by a user or as obtained from an ISE database may be populated for each affected bank in fields 1822, and the number of each type of receiver used as calculated may be specified in fields 1823. Accordingly, although only one type of input receiver is shown in this example, it should be appreciated that fewer or more than one type may be implemented. The total number of input receivers used for all banks may be specified in field 1824 and the number of input receivers used for each affected bank may be specified in fields 1825.

In addition to summing up the number of input receivers used for fields 1824 and 1825, the amount of ground bounce due to SSI may be calculated for each affected bank and populated in fields 1826. The number of inputs and the input standard type may be used to determine the amount of ground bounce induced. The scaling factor for mV of ground bounce for each operating scenario may be determined by manufacturer's data or through other means such as curves, graphs, calculations, and the like. Alternatively, the effect of SSI may be calculated based on the number of SSI allowed per power/ground pair.

Above the profile of FPGA output undershoot/overshoot was described. Now the profile of FPGA input undershoot/overshoot is described. A user may specify the number of inputs not properly terminated for each bank in fields 1827. In fields 1828, a user may specify the maximum input undershoot below ground for each bank. The maximum input overshoot above VCCO may be specified for each bank in fields 1829. Consequently, the amount of ground bounce due to input undershoot/overshoot may be determined for each bank and placed in fields 1830.

Field 1830 shows the amount of ground bounce induced by input undershoot/overshoot. The number of pins with undershoot/overshoot, the voltage level and duration of undershoot/overshoot, and the input standard type may be used to determine the amount of ground bounce. The scaling factor for mV of ground bounce for each operating scenario may be determined by manufacturer's characterization data or through other means such as calculations, graphs, calculations, and the like.

WASSO utilization and status is described next. Notably, an example of 1-Bank and 2-Bank WASSO utilization and status is described; however, fewer than 1-Bank or more than 2-Bank WASSO utilization and status may be implemented from the description herein. SSO Allowance for each 1-Bank may be calculated and placed in fields 1831, and 1-Bank WASSO utilization may be calculated for each bank and placed in fields 1832. Accordingly, these values may be indicated as a percentage indicating the change of an assumed value of a load capacitance. Thus, depending on whether the change exceeds a threshold percentage, the 1-Bank utilization WASSO status may be indicated such as pass or fail for each bank and populated in fields 1833. Notably, each bank may have its own 1-bank SSO Allowance number, as populated in fields 1831, which may be the product of three scaling factors as previously described.

The effect of SSI may be added to the effect of SSO in the calculation of 1-Bank WASSO utilization in field 1832. For some implementations, it may be possible to account for the SSI effect of one input standard using the mV approach and another input standard using the SSI per power/ground pair approach. Notably, 1-Bank WASSO utilization in field 1832 may account for SSI, if SSI limits are specified for the input standard used. Otherwise, the effect of SSI may be accounted for by subtracting the content of field 1826 from a ground bounce limit 1786.

For a 2-Bank SSO Allowance and WASSO utilization, banks are combined as indicated by the bank 10/6 combination, or the bank 6/MT combination, or the bank MT/5 combination. Notably, the "MT" indicates the middle top meaning the combination of banks 1 and 3 in the above example. Thus, a 2-Bank SSO Allowance or a 2-Bank WASSO utilization may actually effectively be for more than two banks. These values may be calculated and a status provided in a similar manner to that described above for the 1-Bank SSO Allowance and WASSO utilization and status. However, a 2-Bank SSO Allowance may be set as a fixed value of a lowest adjacent 1-Bank SSO Allowance for field 1867. An example as described in more detail below may be to set the 2-Bank SSO Allowance to approximately 115% of the lowest adjacent 1-Bank SSO Allowance; however, other percentages may be used depending on the application. Additionally, 2-Bank WASSO utilization and status may be respectively populated in fields 1868 and 1869 for each bank or banks. Accordingly, WASSO utilization for an entire package may be calculated and populated in field 1834. Another field (not shown) may be added to account for ground bounce due to switching events in CLBs of an FPGA. As described above, it should be appreciated that by using a Sparse Chevron or other noise-reducing pin-out package type, total package WASSO utilization, such as may be calculated for field 1834, may not be needed for particular types of packages. Accordingly, package WASSO utilization may be provided for information purposes only.

For purposes of clarity by way of example and not limitation, particular numerical examples are provided below, though other values may be used. The first scaling factor is obtained by dividing 1 nH by the total inductance as determined in field 1739. The mutual inductance number of field 1738 is used to reduce the total inductance value. Thus, the equation for the first scaling factor may be an assumed total inductance value divided by an actual calculated total inductance value. An example of an assumed total inductance value may be approximately 1 nH.

The numerator used in calculating the second scaling factor is adjusted down by subtracting the ground bounce effects due to SSI in field 1826, the ground bounce effects due to input undershoot/overshoot in field 1830, and the ground bounce effects due to output undershoot/overshoot in field 1797. However, the numerator used in calculating the second scaling factor is adjusted up with the addition of the effects of phase shifting of field 1809 and virtual ground of field 1785. The net effective ground bounce budget of field 1787 is then divided by the 600 mV number. The equation for the second scaling factor may be effective ground bounce budget, as adjusted for noise effects, divided by the expected ground bounce level. An example of an expected ground bounce level may be approximately 600 mV.

Using example values for purposes of clarity an not limitation, the third scaling factor may be equal to:

$$\frac{600\text{mV}}{\left((22\text{pF} - 15\text{pF}) \times (Y)\frac{\text{mV}}{\text{pF}}\right) + 600\text{mV}} \quad (5)$$

which may yield $$\frac{600\text{mV}}{663\text{mV}},$$

or 0.905. Notably, Y, which is the effective capacitance derating factor, is determined from manufacturer's characterization data, and is shown in field 1819. This derating factor may alternatively be determined through other means such as calculations, graphs, and the like.

Field 1831, the 1-Bank SSO Allowance field, is the product of the three scaling factors, and the 1-Bank SSO utilization of field 1832 is the quantity of sum of the number of drivers used divided by the number of devices allowed per power and ground pair times the number of power and ground pairs in a bank for all driver types used and all input receiver types used. Field 1867 for the 2-Bank SSO Allowance is set at percentage of the lowest 1-Bank SSO Allowance number between two adjacent banks, which is three adjacent banks in the case of "Middle Top" or "Middle Bottom" banks. Field 1868, the 2-Bank SSO utilization, is the sum of 1-Bank SSO utilization times the number of power and ground pairs in a bank for all adjacent banks involved divided by the sum all power and ground pairs in all banks involved.

Accordingly, this WASSO module provides flexibility to manage large differences in ground bounce limit from bank to bank. Moreover, ground bounce limit for each individual bank may be specified as described with reference to field 1786. In other words, a different ground bounce limit for each bank may be set instead of having a single limit applied to the entire package.

Notably, 1-Bank and 2-Bank parameters provide the ability to have distinctly different ground bounce limits, with differences as much as approximately 10 times as between two non-adjacent banks, namely two banks which are separated by at least one other bank. If the difference in limit is not large, such as approximately 2 times where the two banks are immediately adjacent to each other. Accuracy for calculation of ground bounce is enhanced, and thus control for levels below approximately 200 mV is provided. Differences in ground bounce levels may be accounted for with an output driver used for monitoring ground bounce. A fast driver will register higher ground bounce voltage levels than a slow driver. A derating factor can be determined from manufacturer's characterization data, graphs, formulas, or calculations. An optimal WASSO utilization may be obtained when the bank with the smallest ground bounce limit is diagonally across from the bank with the largest ground bounce limit.

To account for the effect of internal CLB switching on ground bounce, manufacturer's IC data may be used for parameters such as clock frequency, number of CLBs, LUTs, or flip-flops used, and percent toggle rate, among other known types of IC data. The effect of internal CLB switching on ground bounce may be greater at the center of the package and less at the periphery of the package. Additionally, distance away from a VCC internal pin may be taken into account. Refinement of calculations may be performed to account for differences in voltage levels between positive and negative excursions of internal ground bounce relative to an external reference ground. Notably, although ground bounce has been described, it should be appreciated by those of ordinary skill in the art that the same description is applicable to supply bounce. However, refinement of calculations to account for the amount of ground bounce may be done differently from accounting for the amount of supply voltage bounce. Although an example of FPGA I/O devices is used, it should be appreciated that any IC that uses drivers with different strengths and slew rates may be used, such as for example microprocessors, signal processors, graphics/image processors, and the like. Thus, any ground bounce or Vcc bounce parameter associated with or caused by activity of any circuit or function that resides within any IC is included.

FIGS. 13C-1 through 13C-4 collectively refer to a spreadsheet diagram depicting an exemplary embodiment of a user interface 1900 in accordance with another embodiment of the present invention. The user interface 1900 can be used with a design tool, e.g., a timing degradation prediction module, capable of predicting timing degradations with respect to data signals within an IC. The user interface can be used to predict timing degradation in data signals within a user's proposed design to be implemented, and accordingly there will be logic implementation associated with the design for which the timing degradations are to be accounted for. This logic implementation may be an instantiation of a design in programmable logic. Notably, some fields, which may be propagated in multiple locations of a user interface as noted above, have previously been described, and thus description of same is not repeated. Although three clock domains and three banks are used for purposes of example, fewer or more than three of each may be implemented.

Output logic implementation in an FPGA has been described above with reference to fields 1870, 1814 through 1816, and 1866 of FIG. 13B. Additionally, an output clock entry status may be displayed for each bank in fields 1906.

WASSO utilization percentage may be used as in this example with reference to fields 1786, 1814 through 1816, 1831, 1832, 1870, and 1866 of FIG. 13B; or alternatively actual calculations based on the number of output drivers and input drivers, among other factors may be used. However, the WASSO utilization generally accounts for the different input and output driver device types, strengths, and quantities. The WASSO utilization value also generally accounts for acceptable ground bounce level, effects of virtual power and ground, and phase shifting, among other effects used to provide a WASSO utilization value.

A core logic implementation section may have multiple clock domains which are generally shown here as clocks 1, 2, and 3; however, fewer or more than three clock domains may be used. A name for each clock may be used for association in a design and provided by a user or loaded from an ISE database into fields 1902. Minimum clock frequency optionally may be specified by a user in fields 1903 for each clock domain, and a maximum clock frequency may be specified by a user or loaded from an ISE database into fields 1904 for each clock domain. A core clock entry status for each clock domain may be provided in fields 1901.

The number of flip-flops, including LUTs, driven by a rising edge of a clock signal and the number of flip-flops driven by a falling edge of a clock signal may be input by a user or loaded from an ISE database for each clock domain into fields 1905R and 1905F respectively. Clock enable duty cycles for rising and falling edge clock utilizations may be input by a user into fields 1907R and 1907F respectively.

In field 1961, a user can specify whether values for push-out, pull-in, rise time, or fall time will be calculated. A push-out limit allowed by a user may be specified for each bank in fields 1934. A push-out status for each bank may be displayed in fields 1935. A push-out based upon PDS peak, nominal, and minimum values may be calculated for respectively populating fields 1936 through 1938 for each bank with timing values, such as in picoseconds. Push-out based on PDS peak, nominal, and minimum values may be calculated for respectively populating fields 1939 through 1941 for each bank based on unit intervals. It should be appreciated that if another timing degradation, e.g., pull-in, were selected in field 1961, then the quantities for the fields described above would reflect the selected type of timing degradation.

Notably, fields 1786, 1831 and 1832 have been previously described, and thus values for populating these fields may be replicated here. Maximum and minimum serial bit rates for output logic may be calculated for each clock domain and populated in fields 1913 and 1914, respectively. An effective ground bounce level may be calculated for each clock domain and populated in fields 1915. Fields 1913, 1914, 1786, 1831, 1832, and 1915 as shown in FIGS. 13C-3, for example, may be used in identifying I/O bank usage of the circuit design as described with reference to step 1230 of FIG. 12.

Push-out induced by minimum clock SSO switching can be calculated and populated in fields 1940. Push-out induced by maximum clock SSO switching can be calculated and updated in fields 1941.

Rising and falling edge clock bit rates may be separately calculated for population of fields. For example, a minimum serial bit rate, a maximum serial bit rate, and an effective number of flip-flops driven may be calculated for rising-edge triggered clocking for population of fields 1916R, 1917R, and 1918R, respectively. Moreover, a minimum serial bit rate, a maximum serial bit rate, and an effective number of flip-flops driven may be calculated for falling-edge triggered clocking for population of fields 1916F, 1917F, and 1918F, respectively.

Effective core logic utilization and switching may be calculated for SDR and DDR applications. For example, minimum single-edge serial bit rate, maximum single-edge serial bit rate, and an effective number of flip-flops switching on a single edge of a clock signal may be calculated for each clock domain for respective population of fields 1919 through 1921. Moreover, minimum double-edge serial bit rate, maximum double-edge serial bit rate, and an effective number of flip-flops switching on both edges of a clock signal may be calculated for respective population of fields 1922 through 1924 for each clock domain. Fields 1919-1924 of FIGS. 15B-6, for example, may be used in determining CLB usage within the circuit design as described with reference to step 1435 of FIG. 14.

CLB push-out induced by various internal clocks also may be calculated. Push-out induced by the minimum clock single-edge switching can be calculated and populated in fields 1908. Push-out induced by maximum clock single-edge switching can be calculated and populated in fields 1909. Push-out induced by minimum clock double-edge switching can be calculated and populated in fields 1910. Push-out induced by maximum double-edge switching can be calculated and populated in fields 1911. A quadratic sum of CLB induced push-out by each clock can be calculated and populated in fields 1912. A quadratic sum of CLB induced push-out by all clocks can be calculated and populated in fields 1990.

Timing degradation components may be calculated for each CLB block module induced by a respective clock signal. Again, only three clock domains are described; however, it should be appreciated that fewer or more than three clock domains may be implemented. CLB timing degradation induced by clock signals 1 through 3 may be specified for each clock, respectively. Notably, though not illustratively shown in the exemplary user interface of FIG. 13C, fields may be broken out into four separate categories. For example, CLB timing degradation may be calculated for single-edge switching separately from double-edge switching. Additionally, CLB timing degradation may be calculated for clocks operating at their minimum frequency separately from clocks operating at their maximum frequency. Using these four separate subcategories, four sets of fields may be generated with a set of separate summation fields for each of the four sets. Notably, quadratic or another form of summation may be done for each clock domain.

Additionally, a sum of all SSO timing degradation induced by all clock signals may be calculated for each bank. SSO timing degradation induced by each clock signal may be calculated for each bank. Though not illustratively shown in the exemplary user interface of FIG. 15C, fields may be broken out into separate categories for timing degradation for data signals due to minimum frequency of a clock causing SSO switching and due to maximum frequency of a clock causing SSO switching. A quadratic or other form of summation of all SSO timing degradations induced by all clock signals may be calculated for each bank and placed in fields. This sum may be done separately for minimum frequency clocking and maximum frequency clocking, and a summation may be done for each clock domain.

Notably, the timing degradation prediction module can use a sum of what is indicated as SSO. However, this SSO calculation is based on the WASSO. Notably, the WASSO takes into account SSI. Accordingly, SSO, as calculated within a timing degradation predictor module, can take into account both SSO and SSI. Furthermore, timing degradation values calculated within the timing degradation predictor module may be included in a place and route software tool for placement and routing where timing degradation is taken into account.

In summary, prediction of timing degradation can employ such parameters as minimum and maximum clock frequency, clock enable duty cycle, and a number of CLBs, LUTs, or flip-flops used to calculate the amount of timing degradation expected from a user's design. The amount of timing degradation with respect to data signals predicted could be any number of types, including: push-out, pull-in, rise time, or fall time. The effective data toggle frequency may be calculated based on clock frequency and clock enables, and whether rising, falling, or both rising and falling clock edges are used. Notably, a logic block may have multiple clocks, multiple clock enables, and multiple staggered clock enables.

Additionally, differences in timing degradation as a result of phase shifting, which could be based on manufacturer's characterization data, calculations, graphs, curves, and the like may be taken into account. Phase shift parameters include clock frequency, shift mode, and the value of phase offset. Moreover, differences in timing degradation as a function of variation in temperature (e.g., scaling factor percentage variation or picoseconds of timing degradation per degree Celsius), or voltages (e.g., scaling factor percentage variation or picoseconds of timing degradation per mV of supply variation), as determined by manufacturer's characterization data, calculations, formula, curves, graphs, and the like, may be accounted for. Additionally, it should be appreciated that timing closure with an FPGA place and route tool may be obtained by providing system timing degradation numbers that are used as part of the router's timing constraints.

It should be appreciated that timing degradation may be determined from scaling the number of LUTs or flip-flops used in a user's design against the number of LUTs or flip-flops used in manufacturer's characterization. Timing degradation values may be determined by looking up manufacturer's characterization data, by interpolation of such data, by insertion and replication of such data, by mathematical computation of formula, and the like. Though only CLB blocks and I/O blocks have been described, it should be appreciated that noise of other circuitry on the FPGA, including microprocessors, microcontrollers, DCMs, Digital Frequency Shifters, Phase-Locked Loops, Digital Phase Shifters, Phase-Matched Clock Dividers, BRAMs, DSPs, and MGTs, among other types of known circuits may likewise be addressed. As noted, timing degradation values may be scaled up or down according to whether the data reflects a best or worst case scenario in terms of timing degradation. The scaling can be performed on a per circuit element basis in either direction. Furthermore, although an example of an FPGA is used, any other IC having noise, such as a CPU, microprocessor, signal processor, image processor, or network processor, among other known types of ICs may be used.

Accordingly, predictions or estimates of timing degradation of data signals caused by noise generated by an IC device itself as a result of internal logic switching or output driver switching may be obtained. Such generated noise may be affected by PDS response of discrete capacitors on the PCB, buried capacitance on the PCB, discrete capacitors on the package substrate, buried capacitance on package substrate, and embedded capacitance in the IC die. Timing degradation of data signals in terms of prediction and planning can be applicable to any timing parameter associated with or caused by a circuit. Moreover, one or more than one clock domains may be accounted for.

Figure 14:
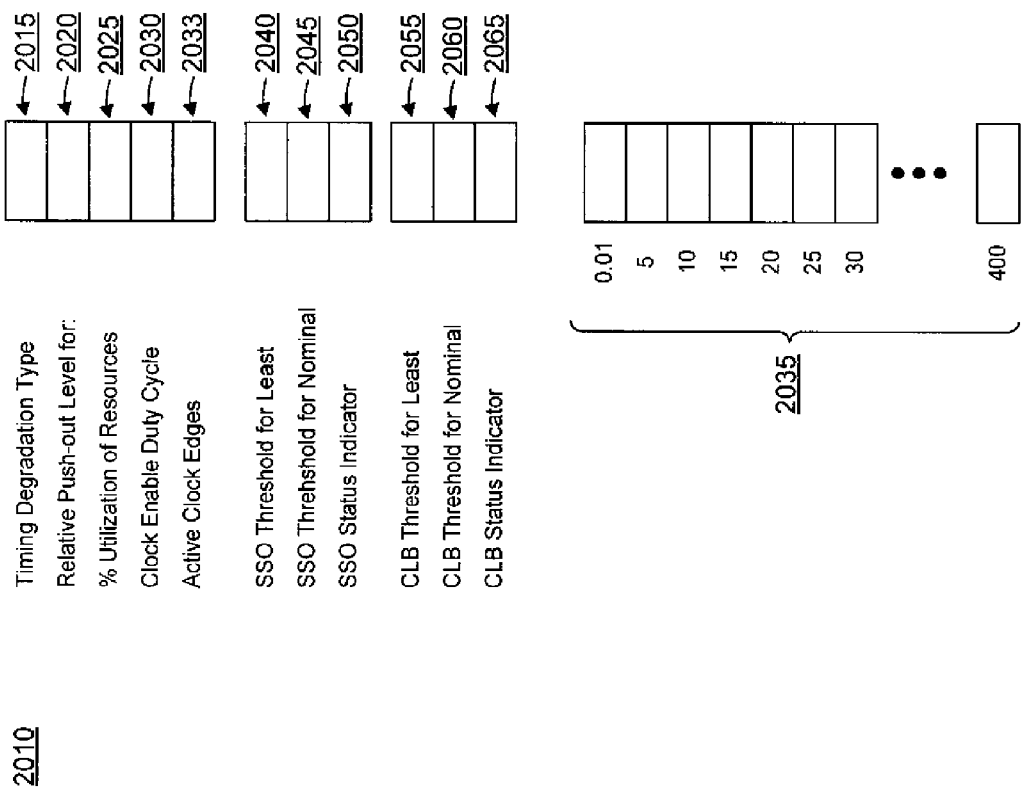
FIG. 14 is a diagram illustrating a visual interface for a circuit design tool in accordance with another embodiment of the present invention.

FIG. 14 refers to a spreadsheet diagram depicting an exemplary user interface 2010 that can be utilized in conjunction with a timing degradation module. The user interface 2010, and thus the timing degradation planning module, may include a timing degradation type field 2015 in which a type of timing degradation can be selected. A relative push-out level field 2020 can be provided in which a type of resource may be selected. For example, either SSO (in relation to I/O banks) or CLBs may be selected in field 2020.

A percent utilization of resources field 2025 can be provided in which an estimate of the percentage of utilization of the type of resource selected in field 2020 can be input. Interface 2010 also can include a clock enable duty cycle field 2030 in which a user may specify or input a clock enable duty cycle to be used in estimating the selected type of timing degradation. A user may specify the active clock edges in field 2033, e.g., rising, falling, or both.

A timing degradation susceptibility array 2035 also can be included. As shown, the timing degradation susceptibility array 2035 can include a range from approximately 10 kHz to approximately 400 Mhz in 5 MHz increments. Of course, other timing degradation susceptibility ranges, as well as other increments, may be used. Timing degradation susceptibility array 2035 may indicate within which frequency ranges are least, more, and most susceptible to other bit rates operating at an indicated frequency range. The timing degradation susceptibility array 2018 can correspond to step 1135 of FIG. 11.

The user interface 2010, in conjunction with the design tool, can provide a means to visually display a range of clock frequencies where timing degradation is least, nominal, and most. This is may be done based on manufacturer's characterization data, or may be done through other means such as calculations, charts, graphs, and the like. "Least," "nominal," and "most" may be generally defined as less than approximately 200 ps, approximately 200-599 ps, and greater than 600 ps, respectively.

Field 2040, for example, allows a user to specify the upper bound for the classification of "least" to be used when SSO is selected in field 2020. Field 2045 allows a user to specify an upper bound for the "nominal" classification for SSO. Any timing degradation greater than the upper bound for the nominal classification can be considered "most." The SSO status indicator field 2050 can compare the specified thresholds to ensure that the threshold for nominal 2045 is greater than the threshold for least 2040.

Similarly, 2055, for example, allows a user to specify the upper bound for the classification of "least" to be used when CLB is selected in field 2020. Field 2060 allows a user to specify an upper bound for the "nominal" classification for CLB. Any timing degradation greater than the upper bound for the nominal classification can be considered "most." The CLB status indicator field 2065 can compare the specified thresholds to ensure that the threshold for nominal 2060 is greater than the threshold for least 2055.

Values determined from the datasets can be compared with the thresholds. Based upon a comparison of data obtained from the datasets with the thresholds, e.g., fields 2040, 2045, 2055, and 2060, fields of the susceptibility array 2035 can be colored to indicate where within the ranges a given field falls.

Notably, examples of I/O Standards that may be used include TTL, GTL, HSTL, SSTL, PECL, BLVDS, GTL, GTLP, PCI, CMOS, and DCI, as well as known variations thereof, such as low voltage versions, among other known interface standards. Additionally, the maximum number of SSOs for each power/ground pair may vary from manufacturer to manufacturer. With respect to Sparse Chevron packages, as well as other configurations for increasing the number of power/ground pairs in proximity to signal pins, the maximum number of SSOs per power/ground pair may be higher.

The flowcharts in the figures illustrate the architecture, functionality, and operation of possible implementations of systems, methods and computer program products according to various embodiments of the present invention. In this regard, each block in the flowcharts may represent a module, segment, or portion of code, which comprises one or more portions of computer-usable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and computer instructions.

Embodiments of the present invention can be realized in hardware, software, or a combination of hardware and software. The embodiments can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

Embodiments of the present invention further can be embedded in a computer program product, which comprises all the features enabling the implementation of the methods described herein. The computer program product can include a computer-usable or computer-readable medium having computer-usable program code which, when loaded in a computer system, causes the computer system to perform the functions described herein. Examples of computer-usable or computer-readable media can include, but are not limited to, optical media, magnetic media, magneto-optical media, computer memory, one or more portions of a wired or wireless network through which computer-usable program code can be propagated, or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A computer-implemented method of predicting timing characteristics within a semiconductor device, the method comprising:
   determining configuration information for the semiconductor device, wherein the configuration information specifies a circuit design to be implemented within the semiconductor device;
   determining, by a computer, a measure of timing degradation for data signals of the circuit design within the semiconductor device according to the configuration information and resource utilization within the semiconductor device, wherein resource utilization specifies resources of the semiconductor device used by the circuit design to be implemented within the semiconductor device versus available resources of the semiconductor device; and
   outputting the measure of timing degradation for the data signals.

2. The computer-implemented method of claim 1, wherein the measure of timing degradation is push-out, wherein determining a measure of timing degradation comprises scaling the measure of push-out according to resource utilization within the semiconductor device.

3. The computer-implemented method of claim 2, wherein determining a measure of timing degradation comprises:
   determining usage of configuration logic blocks within the semiconductor device; and
   scaling the measure of push-out according to configuration logic block usage.

4. The computer-implemented method of claim 2, wherein determining a measure of timing degradation comprises:
   determining usage of input/output banks within the semiconductor device; and
   scaling the measure of push-out according to input/output bank usage.

5. The computer-implemented method of claim 1, wherein the measure of timing degradation is pull-in, wherein determining a measure of timing degradation comprises scaling the measure of pull-in according to resource utilization within the semiconductor device.

6. The computer-implemented method of claim 5, wherein determining a measure of timing degradation comprises:

determining usage of configuration logic blocks within the semiconductor device; and scaling the measure of pull-in according to configuration logic block usage.

7. The computer-implemented method of claim 5, wherein determining a measure of timing degradation comprises:

determining usage of input/output banks within the semiconductor device; and scaling the measure of pull-in according to input/output bank usage.

8. The computer-implemented method of claim 1, wherein the measure of timing degradation is change is rise time, wherein determining a measure of timing degradation comprises calculating a rise time for data signals according to resource usage of the semiconductor device specified by the configuration information.

9. The computer-implemented method of claim 8, wherein determining a measure of timing degradation comprises:

determining usage of configuration logic blocks within the semiconductor device; and scaling the change in rise time according to configuration logic block usage.

10. The computer-implemented method of claim 8, wherein determining a measure of timing degradation comprises:

determining usage of input/output banks within the semiconductor device; and scaling the change in rise time according to input/output bank usage.

11. The computer-implemented method of claim 1, wherein the measure of timing degradation is change is fall time, wherein determining a measure of timing degradation comprises calculating a fall time for data signals according to resource usage of the semiconductor device specified by the configuration information.

12. The computer-implemented method of claim 11, wherein determining a measure of timing degradation comprises:

determining usage of configuration logic blocks within the semiconductor device; and scaling the change in fall time according to configuration logic block usage.

13. The computer-implemented method of claim 11, wherein determining a measure of timing degradation comprises:

determining usage of input/output banks within the semiconductor device; and scaling the change in fall time according to input/output bank usage.

14. A computer-implemented method of predicting timing degradation within a semiconductor device, the method comprising:

selecting a type of timing degradation affecting data signals of the semiconductor device;

selecting a type of resource of the semiconductor device;

selecting a utilization level of the selected type of resource;

determining, by a computer, a level of timing degradation for data signals according to the utilization level of the selected type of resource, wherein the utilization level of the selected type of resource specifies the resources of the selected type of resource of the semiconductor device used by the circuit design to be implemented within the semiconductor device versus available resources of the semiconductor device; and outputting the level of timing degradation.

15. The computer-implemented method of claim 14, further comprising:

setting at least one threshold;

comparing the level of timing degradation to the threshold; and indicating a status of the timing degradation with respect to the threshold according to the comparison.

16. The computer-implemented method of claim 14, wherein selecting a type of timing degradation comprises selecting the type of timing degradation to be push-out or pull-in.

17. The computer-implemented method of claim 14, wherein selecting a type of timing degradation comprises selecting the type of timing degradation to be a change in rise time or a change in fall time.

18. A non-transitory computer-usable medium having computer-usable instructions thereon that, when executed, implement a method of predicting timing characteristics of a semiconductor device, the method comprising:

determining configuration information for the semiconductor device, wherein the configuration information specifies a circuit design to be implemented within the semiconductor device;

determining a measure of timing degradation for data signals of the circuit design within the semiconductor device according to the configuration information and resource utilization within the semiconductor device, wherein resource utilization specifies resources of the semiconductor device used by the circuit design to be implemented within the semiconductor device versus available resources of the semiconductor device; and outputting the measure of timing degradation for the data signals.

19. The computer-usable medium of claim 18, wherein the measure of timing degradation is push-out and wherein determining a measure of timing degradation comprises scaling the measure of push-out according to resource utilization within the semiconductor device.

20. The computer-usable medium of claim 18, wherein the measure of timing degradation is pull-in and wherein the determining a measure of timing degradation comprises scaling the measure of pull-in according to resource utilization within the semiconductor device.

* * * * *